United States Patent
DiFerdinando

(10) Patent No.: US 11,206,225 B2
(45) Date of Patent: Dec. 21, 2021

(54) HYPERSCALE SWITCH AND METHOD FOR DATA PACKET NETWORK SWITCHING

(71) Applicant: Brightways Corporation, Langhorne, PA (US)

(72) Inventor: Stephen DiFerdinando, Langhorne, PA (US)

(73) Assignee: Brightways Corporation, Langhorne, PA (US)

( * ) Notice: Subject to any disclaimer, the term of this patent is extended or adjusted under 35 U.S.C. 154(b) by 51 days.

(21) Appl. No.: 16/853,496

(22) Filed: Apr. 20, 2020

(65) Prior Publication Data

US 2020/0314025 A1   Oct. 1, 2020

Related U.S. Application Data

(63) Continuation of application No. 16/357,226, filed on Mar. 18, 2019, now Pat. No. 10,630,606.

(51) Int. Cl.
 *H04L 12/933* (2013.01)
 *H04L 12/721* (2013.01)
 *H04L 12/741* (2013.01)

(52) U.S. Cl.
 CPC ............ *H04L 49/101* (2013.01); *H04L 45/66* (2013.01); *H04L 45/745* (2013.01)

(58) Field of Classification Search
 CPC ...... H04L 49/101; H04L 45/66; H04L 45/745
 See application file for complete search history.

(56) References Cited

U.S. PATENT DOCUMENTS

| 8,804,733 | B1  | 8/2014  | Safrai et al. |
| 9,225,549 | B2  | 12/2015 | Christenson |
| 2010/0085981 | A1* | 4/2010 | Gupta ................... H04L 45/245 370/419 |
| 2010/0316055 | A1* | 12/2010 | Belanger ................. H04L 49/15 370/396 |
| 2012/0287787 | A1  | 11/2012 | Kamble et al. |
| 2013/0346628 | A1  | 12/2013 | Canion et al. |
| 2015/0180718 | A1  | 6/2015  | Anantharam et al. |
| 2016/0350151 | A1  | 12/2016 | Zou et al. |
| 2017/0111295 | A1  | 4/2017  | Snowdon et al. |
| 2018/0324097 | A1* | 11/2018 | Liu ........................ H04L 45/745 |

FOREIGN PATENT DOCUMENTS

| JP | 2017519449 A | 7/2017 |
| WO | 2013006154 A1 | 1/2013 |

OTHER PUBLICATIONS

International Search Report under International Appl. No. PCT/US2019/038238 dated Dec. 12, 2019.

\* cited by examiner

*Primary Examiner* — Yaotang Wang
(74) *Attorney, Agent, or Firm* — Howard IP Law Group

(57) ABSTRACT

A hyperscale switch is implemented with a plurality of semiconductor crossbar switching elements connected to one another according to a direct point-to-point electrical mesh interconnect for transceiving data packets between peripheral devices connected to the switch and utilizing a lookup table and network device addressing for reduced switching power.

16 Claims, 17 Drawing Sheets

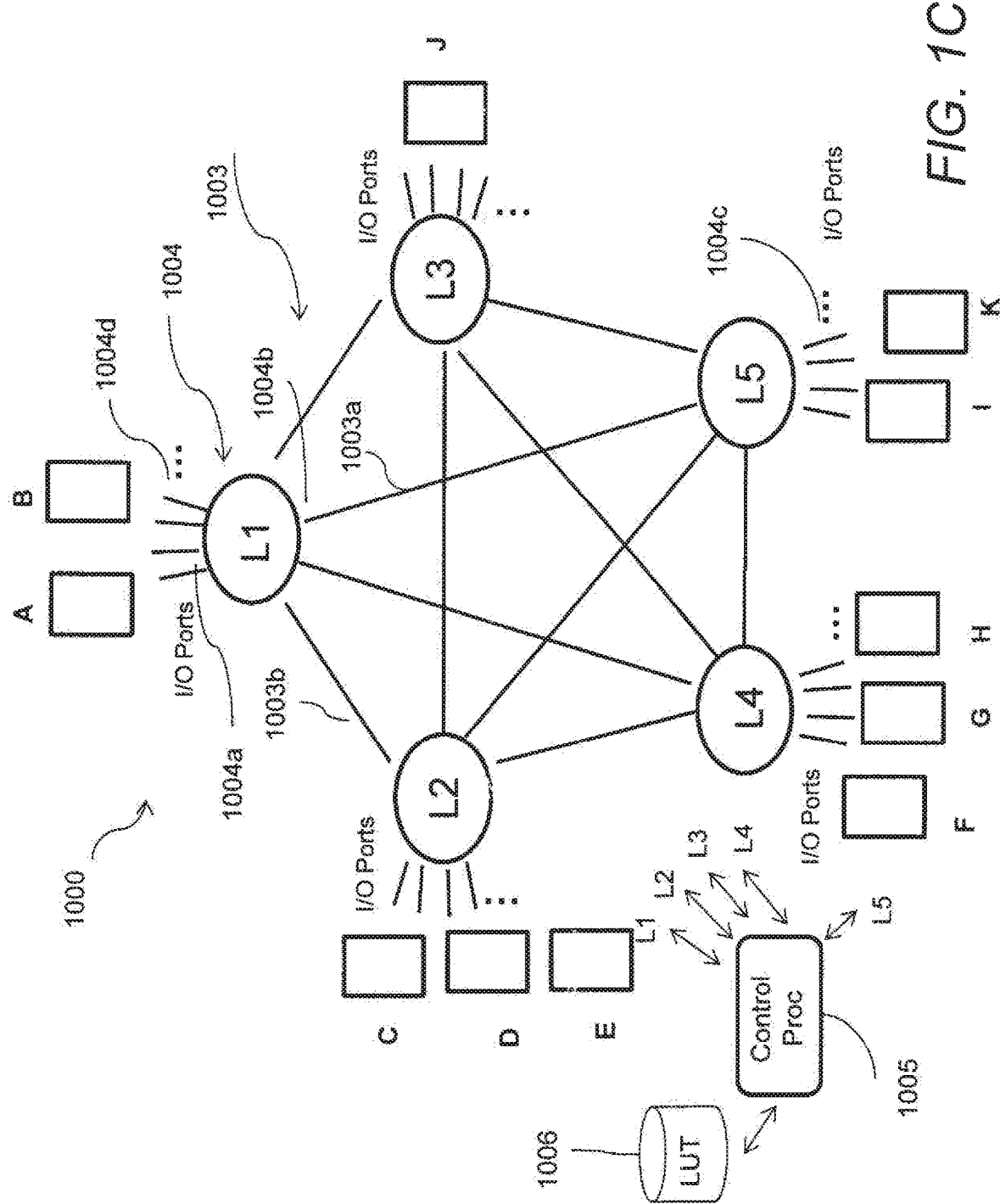

| Route Path | 00 (PSP) | 01 (PSP) | 10 (PSP) | 11 (I/O) | FPGA | | |
|---|---|---|---|---|---|---|---|
| | | | | | I/O Port | | |
| | | | | | 17 | | |
| | | | | | 2 | | |
| | | | | | Line Card | | |
| | | | | | 16 | | |

Fig. 6C

HYPERSCALE SWITCH AND METHOD FOR DATA PACKET NETWORK SWITCHING

CROSS-REFERENCE TO RELATED APPLICATIONS

This application is a continuation application of co-pending U.S. patent application Ser. No. 16/357,226 entitled "System, Method, and Architecture for Data Center Network Switching" filed on Mar. 18, 2019, the entire contents of all of which are incorporated herein by reference for all purposes.

FIELD OF THE INVENTION

The present disclosure relates in general to data packet switched network systems, and more particularly, to a data packet switch management architecture for use in a data center network environment.

BACKGROUND

Cloud computing or processing via "the cloud," represents the delivery of on-demand computing resources over a network configuration such as the internet on a pay-for-use basis. Cloud computing is typically implemented via one or more data centers. A data center is a centralized location rendered with computing resources and crucial telecommunications, including servers, storage systems, databases, devices, access networks, software and applications. With the explosive growth of information technology (IT) and applications requiring heightened security, reliability, and efficient and fast processing times, data centers are increasing worldwide in both size and number. Over 8.6 million data centers are estimated worldwide, with such numbers expected to double every few years. Current projections of the cost to power these data centers is approximately $60 billion per year, amounting to about 8% of current global electricity production. Hyperscale data centers which house such massive computing infrastructures not only consume massive amounts of energy but also discharge significant pollutants into the atmosphere each year, including but not limited to hundreds of millions of tons of carbon dioxide ($CO_2$). Additional problems associated with hyperscale data centers include thermal heating and cooling requirements for ensuring proper device and system operations, increased capital costs and expenditures for diesel generators, battery backups, power conversion, cooling, and the like. Further still, size and processing limitations associated with semiconductor (e.g. silicon) electronic elements or devices, and the need for enhanced processing speed and concomitant increase in utilization of and cost for electricity contribute to the need for new technical solutions.

Networked storage systems and remote computing systems can be included in high-density installations, such as rack-mounted environments. However, as the densities of networked storage systems and remote computing systems increase, various physical limitations are being reached. These limitations include density limitations based on the underlying storage technology as well as computing density limitations based on the various physical space requirements for network interconnects, in addition to significant space requirements for environmental climate control systems.

In addition to the above, these bulk storage systems traditionally have been limited in the number of devices that can be included per host. This can be problematic in storage environments where higher capacity, redundancy, and reliability are desired. These shortcomings may be especially pronounced with the increasing data storage and retrieval needs in networked, cloud, and enterprise environments. Still further, power dissipation in a switch is directly proportional to the number of switch hops needed to traverse integrated circuit devices (and serializers/deserializers or SERDES) for transferring data packets from a source or ingress port of a network connected first peripheral device, to a destination or egress port of a network connected second peripheral device. Thus, power requirements and power usage/consumption within network data packet switches represent significant technological as well as environmental challenges.

Alternative systems, devices, architectures, apparatuses, and methods for overcoming one or more of the above identified shortcomings is desired.

SUMMARY

Systems, devices, architectures, apparatuses, methods and computer programs are presented for implementing a network switching apparatus for communicating data packets from a first switch-connected peripheral device, to a second switch-connected peripheral device. It should be appreciated that embodiments of the present disclosure may be implemented in numerous ways, as will be understood by one of ordinary skill in the art, and in accordance with such methods, apparatuses, systems, devices, computer programs, and architectures. Several embodiments are described below.

In one embodiment of the present disclosure, a non-Clos network data packet switch apparatus for communicating data packets from a first switch-connected peripheral device, to a second switch-connected peripheral device. The apparatus comprises a plurality of semiconductor crossbar switch elements disposed within a chassis and having a plurality of associated external I/O ports for connecting with corresponding peripheral devices for transceiving data packets, and a plurality of associated internal I/O ports. A point-to-point electrical mesh interconnect defines a direct electrical connection between one internal I/O port of each semiconductor cross bar switch element, and one internal I/O port of each other semiconductor cross bar switch element. A control processor is configured to maintain a lookup table mapping of peripheral device connections with corresponding external I/O ports associated with the plurality of semiconductor crossbar switch elements. Each semiconductor crossbar switch element is configured to: responsive to detection of a data packet on one of its external I/O ports, determine a destination semiconductor crossbar switch element for the data packet and a destination external I/O port of the destination semiconductor crossbar switch element, according to the lookup table mapping and based on an address header of the data packet. On the condition that the destination semiconductor crossbar switch element is different from the semiconductor crossbar switch element that detected the data packet on one of its external I/O ports, that element outputs the data packet and an indicator of the destination external I/O port, onto one of its internal I/O ports that is connected to the destination semiconductor crossbar switch element via the point-to-point electrical mesh interconnect. If the destination semiconductor crossbar switch element is the same as the source element according to the lookup table, the source element outputs the data packet onto its own destination external I/O port according to the lookup table.

Each semiconductor crossbar switch element is further responsive to receipt of a data packet and an indicator of a destination external I/O port on one of its internal I/O ports for outputting the data packet, without the indicator, onto the external I/O port identified by the indicator, to the second switch-connected peripheral device, whereby the routing of data packets from the first switch-connected peripheral device, to the second switch-connected peripheral device traverses only at most two semiconductor crossbar switch elements.

The semiconductor crossbar switch element comprises at least one integrated circuit. The at least one integrated circuit may be one of an ASIC and an FPGA.

The point-to-point electrical mesh interconnect may be comprised of at least one multi-layer stack of electrically interconnected printed circuit boards. In an embodiment, the at least one multi-layer stack of electrically interconnected printed circuit boards may be silicon-free. In an embodiment, the stack of silicon-free electrically interconnected printed circuit boards may be via-free. Each semiconductor crossbar switch element is configurable for one of 10 Gb, 25 Gb, 40 Gb, 50 Gb, and 100 Gb signal line processing.

In an embodiment, the point-to-point electrical mesh interconnect may be comprised of a plurality of discrete internal network transmission lines or wires. In an embodiment, the point-to-point electrical mesh interconnect may be embodied as twinax or coaxial cables. In an embodiment, the point-to-point electrical mesh interconnect may be embodied as a fiber optic PCB design other than electrical/copper PCB. In addition, the embodiment can include modulation schemes to increase transmission line capacity for network traffic such as PAM or PSK or QAM modulations.

In an embodiment, the address header is one of a MAC address header and an IP address header.

In an embodiment, the lookup table stores MAC addresses or IP addresses corresponding to connected peripheral devices.

In an embodiment, the network is an Ethernet network.

In an embodiment, further processing includes performing virtual output queuing on the data packet transfers from ingress to egress of each of the semiconductor crossbar switch elements as part of the crossbar packet transfer scheduler.

In an embodiment, MAC or IP address headers within a lookup table are obtained and mapping updates are made to map peripheral device connections with corresponding external I/O ports associated with the plurality of semiconductor crossbar switch elements. A master lookup table may contain the MAC or IP address headers of the peripheral devices connected with corresponding external I/O ports associated with the plurality of semiconductor crossbar switch elements and periodically update corresponding local lookup tables for access by each of the semiconductor crossbar switch elements.

In an embodiment, a non-Clos network data packet switch method comprises receiving, at an external I/O port of a first network semiconductor switch element electrically connected to a peripheral device, network traffic data packet to be forwarded to a second peripheral device connected to an external I/O port of one of a plurality of network semiconductor crossbar switch elements; determining, at the first network semiconductor crossbar switch element, a destination external I/O port on which the network traffic data packet is to be forwarded, according to a lookup table mapping peripheral device connections with corresponding external I/O ports of the plurality of network semiconductor crossbar switch elements, and according to an address header corresponding to the destination peripheral device connected to the network; prepending to the network traffic data packet an indicator of the destination external I/O port of the second network semiconductor switch element; and forwarding the network traffic data packet to the second network semiconductor switch element, via a direct point-to-point electrical mesh interconnect which defines a direct electrical connection between one internal I/O port of each semiconductor cross bar switch element, and one internal I/O port of each other semiconductor cross bar switch element. The method further comprises receiving by the second network semiconductor crossbar switch element, at its internal I/O port connected to the first network semiconductor crossbar switch element via the direct point-to-point electrical mesh interconnect, the prepended network traffic data packet; and outputting by the second network semiconductor crossbar switch element the network traffic data packet onto the destination external I/O port to the second switch-connected peripheral device, whereby the routing of data packets from the first switch-connected peripheral device, to the second switch-connected peripheral device traverses only at most two semiconductor crossbar switch elements.

In an embodiment, a non-Clos data network switch system for communicating data packets from a first switch-connected peripheral device, to a second switch-connected peripheral device, comprises: a chassis; a plurality of line cards housed within the chassis and having I/O terminals for transceiving data packets; a plurality of semiconductor crossbar switch elements, each having external I/O ports in electrical communication with I/O terminals of corresponding ones of the plurality of line cards housed within the chassis, for routing data packets between switch-connected peripheral devices; a control processor configured to maintain a lookup table mapping peripheral device connections with corresponding external I/O ports associated with the plurality of semiconductor crossbar switch elements; wherein each semiconductor crossbar switch element comprises a forwarding processor configured to access the lookup table in response to a data packet received at a given external I/O port of the semiconductor cross bar switch element, and route the data packet according to the lookup table and an address header of the data packet, onto another one of the external I/O ports corresponding to a destination one of the plurality of semiconductor switch elements, via a direct point-to-point electrical mesh interconnect directly connecting each of the plurality of semiconductor crossbar switch elements with every other one of the semiconductor crossbar switch elements; whereby the routing of data packets from the first switch-connected peripheral device, to the second switch-connected peripheral device traverses only at most two semiconductor crossbar switch elements associated with the line access cards.

In one embodiment of the present disclosure, a network switching apparatus for communicating data packets from a first switch-connected peripheral device, to a second switch-connected peripheral device, comprises a chassis containing a plurality of line cards with each line card interconnected via a direct point-to-point mesh interconnect pattern or network. A control processor is configured to maintain a lookup table mapping peripheral device connections with corresponding I/O ports associated with the plurality of line cards. On each line card a crossbar switching element is configured to enable electrical connection of any one of the line card I/O ports through the direct point-to-point electrical mesh interconnect pattern which connects each of the plurality of line cards with every other one of the line cards, to a corresponding destination port on one of the plurality of line access cards. The switching connection is made in response to detection of a data packet on an ingress I/O port of a given line card. Through the switching element on the line card, the data packet is routed or forwarded over the direct point-to-point electrical mesh interconnect pattern according to the lookup table mapping based on a destination address header of the data packet, whereby transmission of packets between input and output ports of any two line cards and respective cross bar switch elements occurs in only two hops. In a particular embodiment, each switching element has a direct electrical connection to every other switching element, and egress transmission lines output from any switching element are communicated via the electrical mesh interconnect at select differential pair connections for switching purposes, with the final port destination prepended to the data packet transmitted from the switching element so that no further processing or route determination is required on the electrical mesh, and the downstream line card and switching element. The ingress receive lines on the switching element (e.g. corresponding to the destination port or destination peripheral device) receive directly the data packet and pass through to the destination peripheral port and device. In an embodiment, differential pairs or alternative electrical/optical transmission styles/geometries may be implemented.

According to the architecture of the present disclosure, reduction in the number of physical hops among line cards or integrated circuits on the line cards significantly reduces electrical power consumption and significantly increases speed, in addition to enhancing thermal efficiency and reducing cooling and power requirements of a network packet switch.

In one embodiment of the present disclosure, a hyperscale switch is implemented within a plurality of silicon switching elements, at least one per line card arranged within a rack mount or chassis, each silicon switching element including a routing and forwarding engine for use with a network address identifier such as a media access control (MAC) network address received in a data packet at an I/O port, for transmission to a destination I/O port connected to a peripheral device, wherein an electrical mesh interconnect network architecture provides direct point-to-point connections with each of the corresponding I/O ports on each silicon switching element, within an Ethernet packet routing network configuration.

In another embodiment, the hyperscale switch is implemented with a hypervisor to create and run one or more virtual machines and/or virtualized workloads in accordance with a select network operating system. In one embodiment, the network operating system may be an open source network operating system such as Openflow, or a full stack (closed) system installed with applications running natively in the operating system.

In one embodiment, the direct point-to-point mesh electrical interconnect pattern or network is implemented as a printed circuit backplane comprising multi-gigabit transmission lines with direct point-to-point electrical connections.

In one embodiment, the printed circuit backplane electrical interconnect network is achieved such that the backplane of the device is silicon-free.

In one embodiment, each silicon switching element is configured as an application specific integrated circuit (ASIC) or Field programmable gate array (FPGA) device (e.g. chip) and the printed circuit backplane comprising multi-gigabit copper transmission lines provide direct point-to-point electrical connections with the integrated circuit (IC) chip I/O connections (or system on a chip or SoC) on each of the respective line cards.

In an embodiment, the network switching platform may be configured as a data center LAN mesh architecture embodiment so as to condense networking and provide a gateway for data services while enabling data center expansion of its network virtualization presence.

In an embodiment, the network switch platform is designed for versatility in multiple data center networking applications, either as a standalone high capacity switch or access, end of row, core, or interconnection switch accommodating 10/40/100G optical transceivers with migration capacity.

Embodiments of the present disclosure include a network data packet switch comprising a chassis housing a plurality of line cards having I/O ports thereon for connecting to peripheral devices. Each line card includes one or more silicon switching elements such as ASICs or FPGAs having I/O ports for connecting with every other switching element through a printed circuit backplane or p-spine architecture of point-to-point direct electrical interconnections between each of the switching elements (and hence line cards) within the chassis. Each silicon switching element contains therein a forwarding and routing engine for routing data packets according to a packet address header such as a MAC header via the printed circuit backplane of point-to-point direct electrical interconnections from a source peripheral device connected to the network switch, to a destination peripheral device. The forwarding and routing is performed within the transmitting ASIC or FPGA (or SoC) according to a lookup table containing routing information stored thereon.

In distinction to conventional leaf and spine network architectures, embodiments of the present disclosure provide for a line card with silicon switching element having a forwarding engine co-located on the line card with routing functionality, whereby communications and routing into/out of the line card and silicon switching element via the point-to-point direct electrical interconnection mesh backplane provides reduced serializer/deserializer (SERDES) components and I/O gateway tolls that increase switch speed or throughput speed, while reducing power and I/O component requirements.

In an embodiment of the present disclosure, each line card is configured in a non-Clos packet switching network and includes a plurality of integrated circuits which define a fabric cross bar implementation, wherein each integrated circuit on each line card has a direct (i.e. point-to-point) electrical connection via a printed circuit board backplane, with every other integrated circuit on every line card connected via the printed circuit backplane structure.

In an embodiment of the present disclosure, each line card is configured in a non-Clos packet switching network and includes a plurality of field programmable gate array (FPGA) components which define a fabric cross bar implementation, wherein each FPGA on each line card has a direct (i.e. point-to-point) electrical connection via a silicon-free printed circuit board backplane, with every other FPGA on every line card connected via the silicon-free printed circuit backplane structure.

In an embodiment, the FPGA may be replaced and/or integrated with components including one or more processor cores, microprocessors or microcontrollers, DSPs, graphics processor (GPU), on chip memory, hardware accelerators, peripheral device functionality such as Ethernet and PCIE controllers, and the like, for implementation as a system on a chip (SoC) in connection with communication via the direct point-to-point electrical interconnect structure.

In an embodiment, the architecture of the direct (i.e. point-to-point) electrical connection interconnect structure connecting each of the semiconductor cross bar switch elements having integrated within each semiconductor cross bar switch element MAC, data packet routing and disposition, FIFO output queuing and congestion management processing, VLAN, VXLAN, and VOQ functionality, may be implemented as a virtual switch for execution on a high performance computer server to provide for virtual segmentation, securitization, and reconfiguration.

BRIEF DESCRIPTION OF THE DRAWINGS

FIG. 1C is a simplified schematic diagram of a non-Clos network data packet switch architecture according to an embodiment of the present disclosure.

FIG. 6C is an exemplary illustration showing fields of a lookup and routing table for processing the data packet transfer from source to destination according to an embodiment of the present disclosure.

DETAILED DESCRIPTION

Figure 1A:
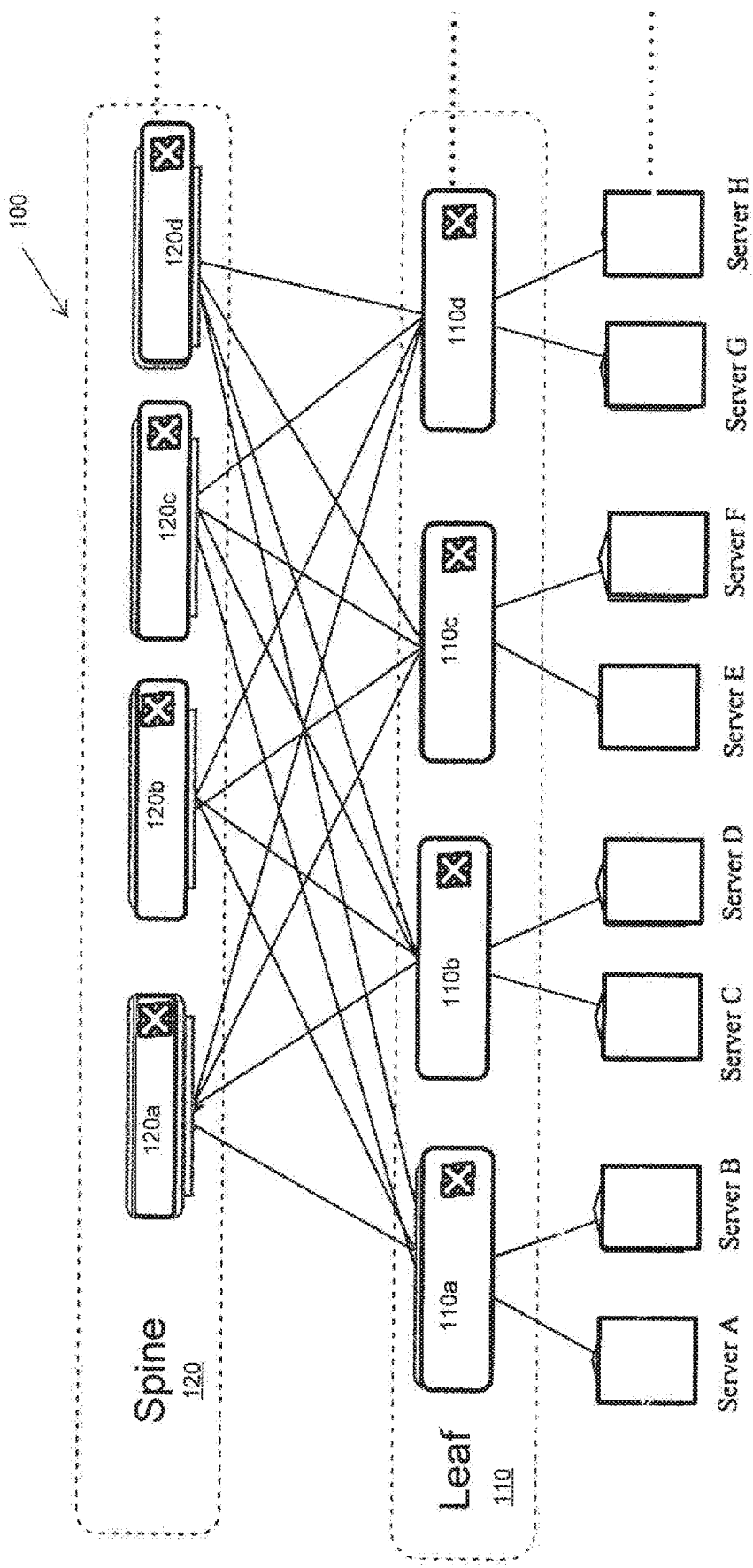
FIGS. 1A and 1B are simplified schematic diagrams of tiered network switch architectures according to the prior art.

It is to be understood that the figures and descriptions of the present invention have been simplified to illustrate elements that are relevant for a clear understanding of the present invention, while eliminating, for purposes of clarity, many other elements found in network switches and packet switching systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Although data packet switching networks may take on a number of forms, in one such form a switch fabric may include a card modular platform. A card modular platform typically comprises a backplane and multiple switch fabric modules and/or other types of boards, such as servers, routers, telco line cards, storage cards and so on, contained within a single unit, such as a chassis or shelf, for example, that permits data packet switching between a plurality of network nodes, thereby forming the switch fabric between the network nodes.

FIG. 1A illustrates a switch interconnect in the form of a Clos network 100 according to the prior art. In general, Clos network 100 includes packet switches having uplink ports that are coupled to uplink ports of other packet switches. The packet switches also include downlink ports that may be coupled to hardware resources or peripheral devices (labeled as servers A through H). Such peripheral devices may be implemented not only as servers but as network interfaces, processors, storage area network interfaces, hosts, and so on. The Clos network switching architecture of the prior art may implement a Clos or folded Clos network having a leaf and spine with fabric module architecture as shown in FIG. 1A. Each leaf server or line card device of FIG. 1A is represented as element 110 (shown as 110a-110d) and the spine with fabric module is represented as element 120 (shown as 120a-120d).

The servers are connected to leaf switches (such as top of rack or TOR switches) with each leaf switch connected to all spine switches. As shown, each peripheral device or server is at least three physical hops away from every other peripheral device, as the processing requires data packet routing from a source peripheral device (e.g. server A) to a destination peripheral device (e.g. server E) through a 3 hop leaf and spine network (e.g. 110a, 120b, and 110c) to reach its destination. The structure may be further expanded to a multi-stage (e.g. 5-stage CLOS) by dividing the topology into clusters and adding an additional spine layer (also referred to as a super-spine layer). Considering the Clos crossbar fabric, and current art implementations, an additional semiconductor device operative as a staging module for assessment in the route for packet forwarding fabric requires each device to be 5 hops away from one another. As each hop through a semiconductor device suffers from dissipating power (work) through resistance and loss of throughput speed traversing through the semiconductor, such a system exhibits several disadvantageous features. Aspects of the present disclosure integrate the crossbar switching functionality, the forwarding and routing, virtual output queuing, VLAN, and control plane integration within a semiconductor FPGA device, integrated circuit, or SoC, which may be implemented on a line card, in order to achieve the advantages discussed herein.

Figure 1B:
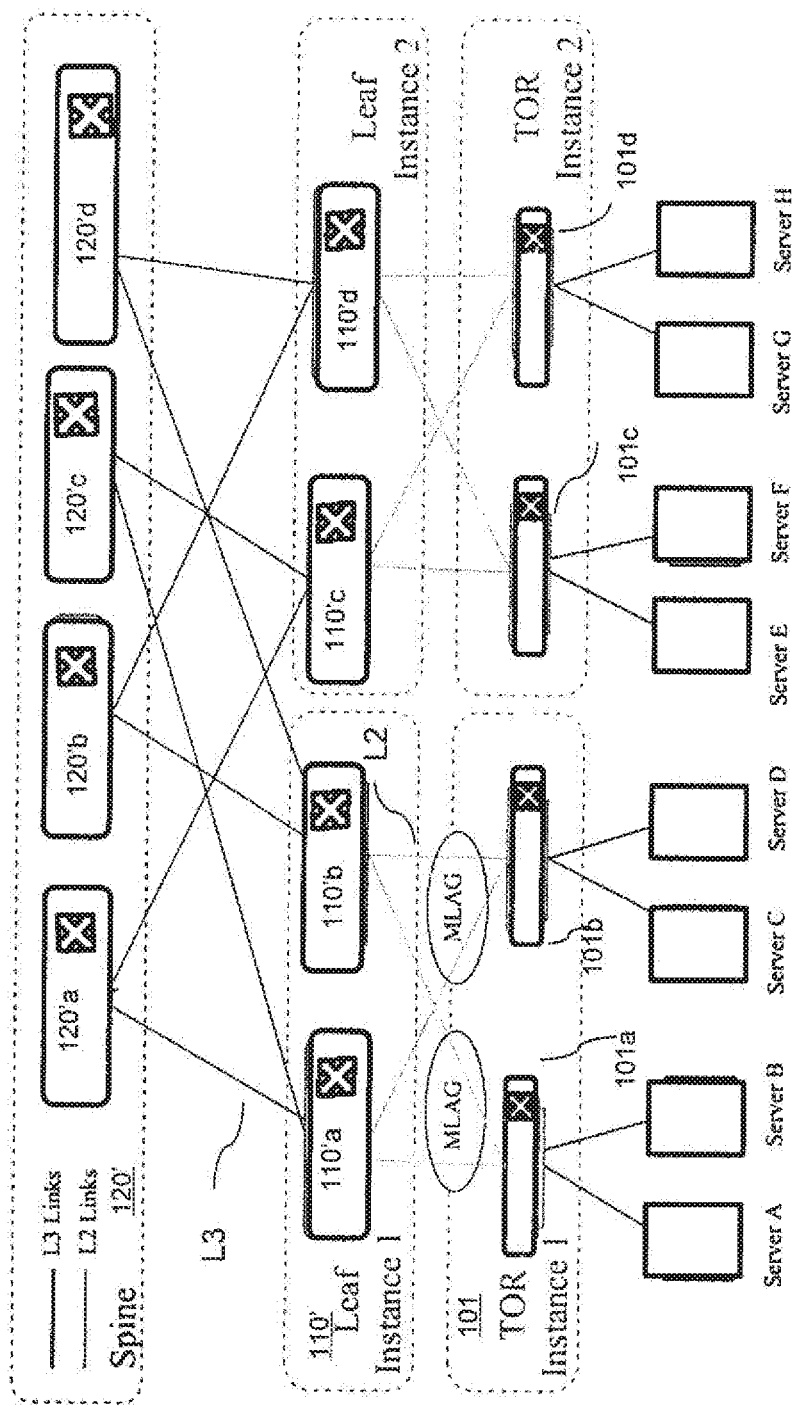

FIG. 1B shows another CLOS switching embodiment, including Multi-Chassis Link Aggregation Group (MLAG or MCLAG). Servers may be can be connected to two different leaf 110' or TOR 101 switches in order to have redundancy and load balancing capability. The prior art CLOS architecture embodiment of FIG. 1B may utilize both OSI layer 2 (L2) packet switching as well as layer 3 (L3) routing, where packets are sent to a specific next-hop IP address, based on a destination IP address. FIG. 1B shows a CLOS topology using Layer 3 routing for spine 120' to leaf 110' connections and multiple TOR as well as leaf switch instantiations. Similar to the routing requirements of FIG. 1A, the CLOS architecture of FIG. 1B also requires multiple hops through additional semiconductor devices in the routing of a data packet for traversing the data packet switch network in order to transfer packets from one peripheral device (e.g. server A) to another peripheral device (e.g. server C). Each hop through a semiconductor suffers from dissipating power through the resistance physics of semiconductors and loss of throughput speed traversing through the semiconductor.

In contrast to conventional leaf server and spine server network architectures such as those shown in FIGS. 1A and 1B, wherein a multi-tier Clos architecture is implemented which requires multiple hops (3 or greater) to switch data packets from a given input port of a connected device (e.g. server A) to a given output port of a connected device (e.g. server B), embodiments of the present disclosure provide a non-Clos network implemented as a collapsed or flattened (e.g. linear) form of network element architecture and data packet switching, which reduces the number of hops between I/O devices, while increasing the speed and reducing the power requirements for a given switching operation. Moreover, embodiments of the present disclosure integrate within a single semiconductor switch element multiple functionalities which serve to reduce power dissipation, increase switch speed, and maintain industry standard form factor within a data network architecture. Embodiments of the present disclosure integrate previously disparate functionalities onto or within a single semiconductor switch element to provide forwarding and routing engine and crossbar switching functionality, virtual output queuing (VOQ), and VLAN functionality within a non-Clos mesh network data packet switch.

In one exemplary embodiment, there is disclosed a chassis which houses multiple line cards or line card blades, where each line card has a faceplate with slots configured to receive a peripheral device connection. Each line card may contain a semiconductor crossbar switching element implemented as an integrated circuit or FPGA or system on a chip and configured to route data packets through a direct point-to-point electrical mesh interconnect. The electrical mesh interconnect directly connects I/O ports on each of the semiconductor crossbar switching elements with every other semiconductor crossbar switching element, whereby data packet routing is accomplished according to an address header on the received data packet and a lookup table of peripheral device connections associated with the semiconductor crossbar switching element, to thereby enable a 2 hop packet switch network. The network may be implemented as a hyperscale or compound switch.

Embodiments of the present disclosure may be implemented within a chassis using rack mount line cards, or may be implemented using blades and various form factors, with particular card configurations (e.g. horizontal, vertical, or combinations thereof), as well as different card/I/O numbers (e.g. N=2, 4, 8, 16, 24, 32, etc.—although powers of 2 are not required and the numbers maybe be any positive integer).

As used herein in embodiments of the present disclosure, the term "hop" represents a single physical hop that includes a direct physical connection between two devices in a system. Similarly stated, a single physical hop can be defined as a traversing or routing of a data packet which traverses through an integrated circuit (e.g. an FPGA, microchip, ASIC, or other programmable or reprogrammable chip device) and any one set of its transceivers or serializer/deserializer (SERDES) device input(s) to its SERDES device output(s) on a switching element.

Exemplary embodiments of the present disclosure may implement a network data packet switch comprising line cards configured within a chassis and each having disposed thereon (or associated therewith) a semiconductor crossbar switch element connected with every other semiconductor crossbar switch element with fabric module via a direct point-to-point electrical mesh interconnect backplane structure. In an embodiment, the backplane structure may be semiconductor or silicon-free. In a particular embodiment, the direct point-to-point electrical mesh interconnect backplane structure may be implemented as a printed circuit electrical mesh interconnect. In another particular embodiment, the direct point-to-point electrical mesh interconnect backplane structure may be implemented as a plurality of discrete wires (e.g. micro wires or nano wires).

In further distinction to conventional leaf and spine network architectures, embodiments of the present disclosure provide for a semiconductor crossbar switch element having a forwarding engine co-located on a line card with routing functionality whereby communications and routing into/out of the switch element (and hence line card) via a direct point-to-point electrical mesh interconnect provides reduced SERDES and I/O gateway tolls that increase switching throughput or decrease switch latency, while reducing power and I/O component requirements.

According to a further implementation of the present disclosure, each switch element includes one or more ASICs or field programmable gate array (FPGA) components which together with the direct point-to-point electrical mesh interconnect define a fabric cross bar implementation. Each switch element is associated with a line card, and each FPGA on each line card has a direct (i.e. point-to-point) electrical connection (via the silicon-free printed circuit board backplane) with every other FPGA on the corresponding line card.

Referring now to FIG. 1C, there is shown a simplified schematic diagram of a non-Clos network data packet network switch architecture 1000 according to an embodiment of the present disclosure. As shown therein, semiconductor crossbar switch elements 1004 (data network packet switches) labeled as L1-L5 are configured in a flattened architecture so that data packet communication between resources (e.g. peripheral devices identified as server A-server K) is accomplished with a reduced number of hops. More particularly, each semiconductor switch element (e.g. L1) has a plurality of associated external I/O ports (e.g. 1004a) for connecting with corresponding peripheral devices (e.g. server A) for transceiving data packets. Each semiconductor switch element also has a plurality of associated internal I/O ports 1004b. A point-to-point electrical mesh interconnect 1003 defines a direct electrical connection between one internal I/O port of each semiconductor cross bar switch element, and one internal I/O port of each other semiconductor cross bar switch element. A control processor 1005 is configured to maintain a lookup table (LUT) 1006 mapping of peripheral device connections with corresponding external I/O ports associated with the plurality of semiconductor crossbar switch elements. In response to detection of a data packet on one of its external I/O ports, semiconductor crossbar switch element L1 determines a destination switch element (e.g. L5) for the data packet and a destination external I/O port of the destination semiconductor crossbar switch element (e.g. 1004c), according to the lookup table mapping (LUT) and based on an address header of the data packet. On the condition that the destination semiconductor crossbar switch element is different from the semiconductor crossbar switch element that detected the data packet on one of its external I/O ports, that element outputs the data packet and an indicator of the destination external I/O port, onto one of its internal I/O ports that is connected to the destination semiconductor crossbar switch element via the point-to-point electrical mesh interconnect (e.g. 1003a). If the destination semiconductor crossbar switch element is the same as the source element according to the lookup table (e.g. data packet communication between server A and server B), the source element (e.g. L1) outputs the data packet onto its own destination external I/O port (e.g. 1004d) according to the lookup table mapping (without traversing the mesh interconnect). In this manner, the matrix configuration of semiconductor crossbar switch element connections to one another through the point-to-point electrical mesh interconnect, and the re-direct I/O connection when the point-to-point electrical mesh interconnect is not utilized (for same destination board/same destination semiconductor switch element I/O), provides for a system with less power dissipation, increased throughput speeds, and reduced cooling energy requirements.

On the receive or destination (ingress) side, each semiconductor crossbar switch element (e.g. L5) is further responsive to receipt of a data packet and an indicator of the destination external I/O port at one of its internal I/O ports. In response, the ingress semiconductor crossbar element receives and outputs the data packet, without the indicator, onto the external I/O port identified by the indicator (e.g. 1004c), to the second switch-connected peripheral device (e.g. server K). In this manner, the routing of data packets from the first switch-connected peripheral device, to the second switch-connected peripheral device traverses a minimum number (only at most two) of semiconductor crossbar switch elements or two hops.

In comparison to the multi-tier and multi-hop leaf and spine with fabric module architecture of FIGS. 1A and 1B, the architecture of the present disclosure implements data packet switching with reduced hops and increases the routing speed or throughput within the system, reduces the power required by traversing less transceiver or SERDES I/O chips, and results in less heat being produced, thereby achieving substantially reduced electrical power consumption and associated heat (thermal output).

The data packets may comprise a stream of data units (e.g., data packets, data cells, a portion of a data packet, a portion of a data cell, a header portion of the data packet, a payload portion of the data packet, etc.) from a peripheral processing device (devices A-K). The data packet stream forwarded from the first switching element L1 connected to the peripheral processing device A and destined to the peripheral processing device K has prepended onto it an indicator of the destination I/O port for processing through the second crossbar switch element L5 via the direct electrical mesh interconnect 1003a.

Each data packet delivered to and detected by an external I/O port of a semiconductor crossbar switch element includes a header comprising an identifier of the source peripheral processing device (e.g., an Internet Protocol (IP) address or a medium access control (MAC) address of the peripheral processing device), and an identifier of the destination peripheral processing device (e.g., an IP address or a MAC address of the peripheral processing device). The egress semiconductor crossbar switch element strips off the destination address (e.g. the destination MAC address) and uses this address as an index to lookup table 1006. The lookup table contains entries mapping each of the semiconductor crossbar switch elements with I/O ports according to the point-to-point connectivity of electrical mesh interconnect to the internal I/O ports of each switch element, and each of the external I/O connections to each of the known peripheral devices. The lookup table mapping provides the particular destination (ingress) semiconductor cross bar switch element and corresponding external I/O port of that destination element that connects to the destination peripheral device. The egress semiconductor crossbar switch element then activates a corresponding one of its internal I/O ports that connects, via the point-to-point electrical mesh interconnect, to the corresponding (ingress) destination switch element that is connected to the destination peripheral device.

The egress semiconductor switch element also prepends to the data packet the corresponding external I/O port of the destination semiconductor switch element device to which the data packet is to be forwarded onto, based on the lookup table mapping. The internal I/O port activated at the egress semiconductor crossbar switch element transfers the data packet with the destination external I/O port identifier, over the direct electrical connection mesh interconnect, to an internal I/O port of the destination (ingress) semiconductor switch element. This destination semiconductor switch element reads the data packet header containing the prepended information of the external I/O port, discards any extraneous header data, and routes the data packet through this switch and onto that port which is directly connected to the destination peripheral device for receipt by that device.

In this manner, only at most two semiconductor switch elements are traversed in any data packet switching between any two switch connected peripheral devices.

Figure 2:
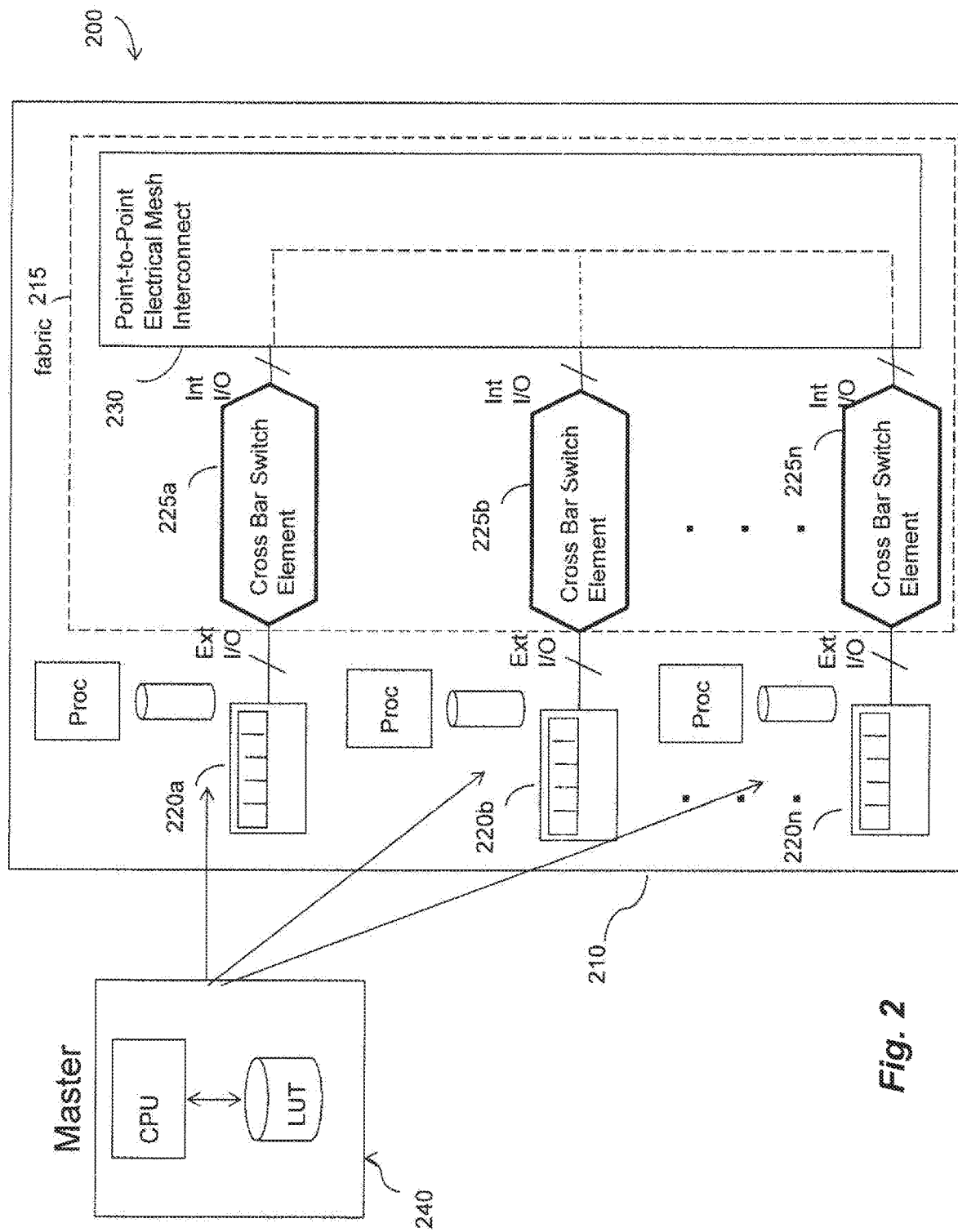
FIG. 2 is a more detailed schematic diagram of a network data packet switch architecture according to an embodiment of the present disclosure.
Figure 2A:
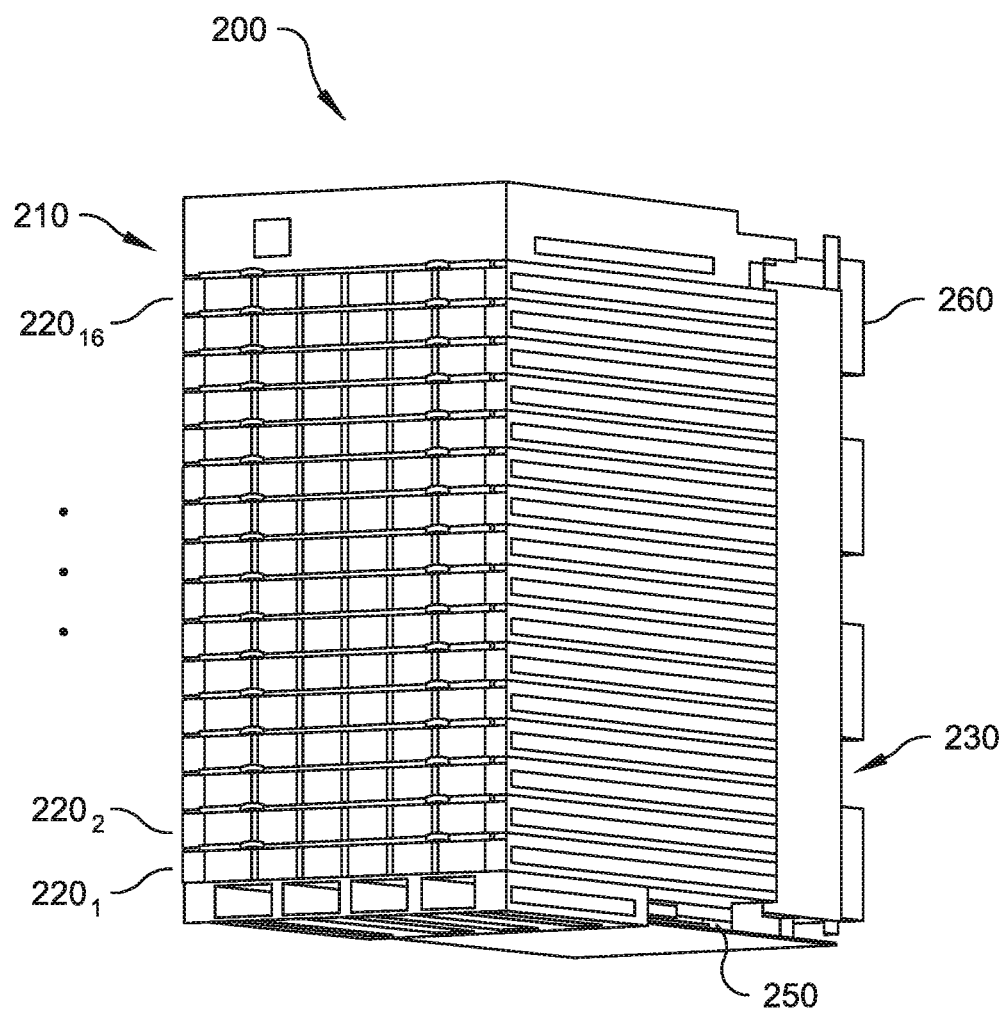
FIGS. 2A, 2B, 2C, and 2D illustrate exemplary partial and cutaway views showing components of a network data packet switch architecture according to an embodiment of the present disclosure.
Figure 2B:
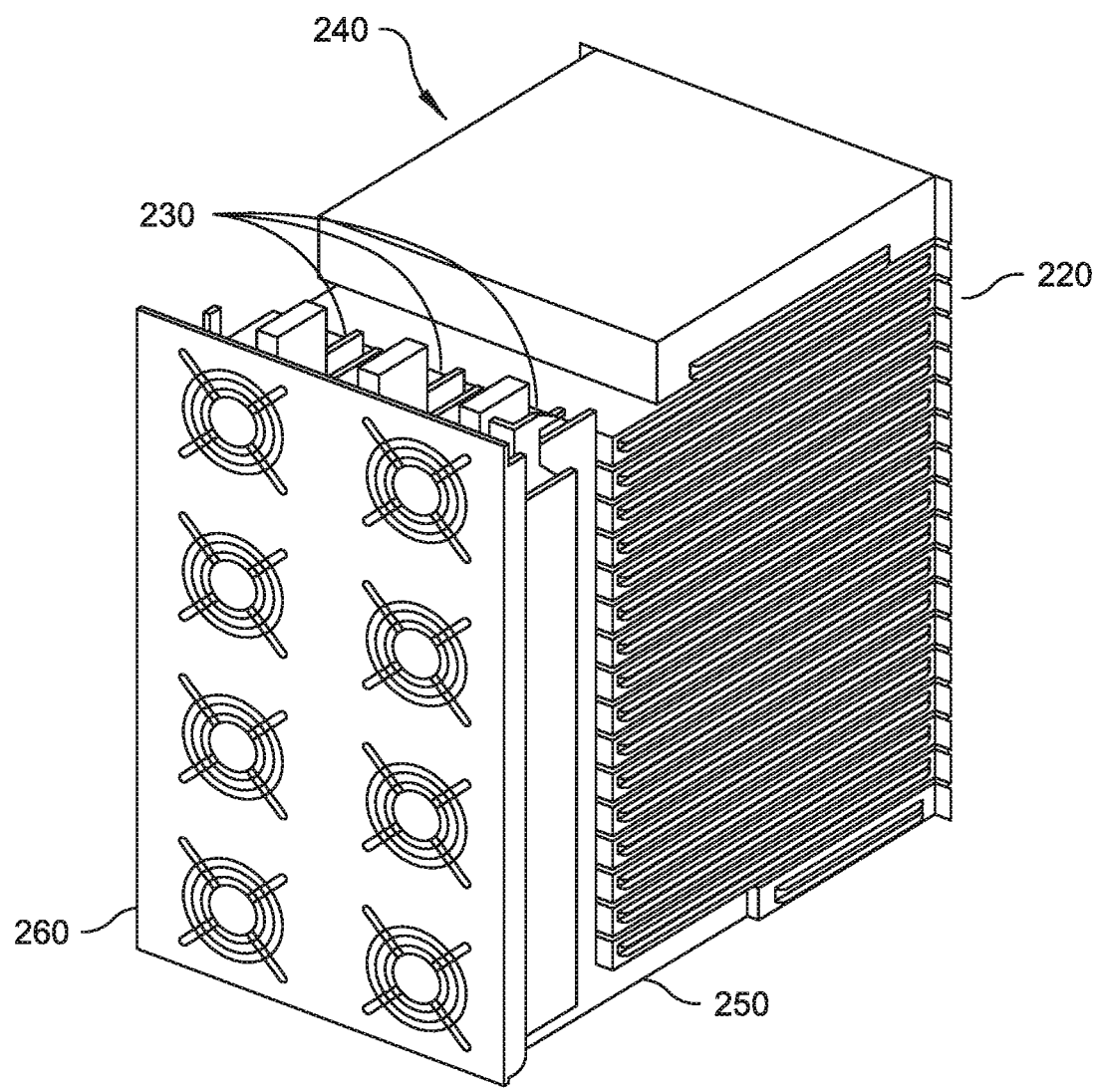
Figure 2C:
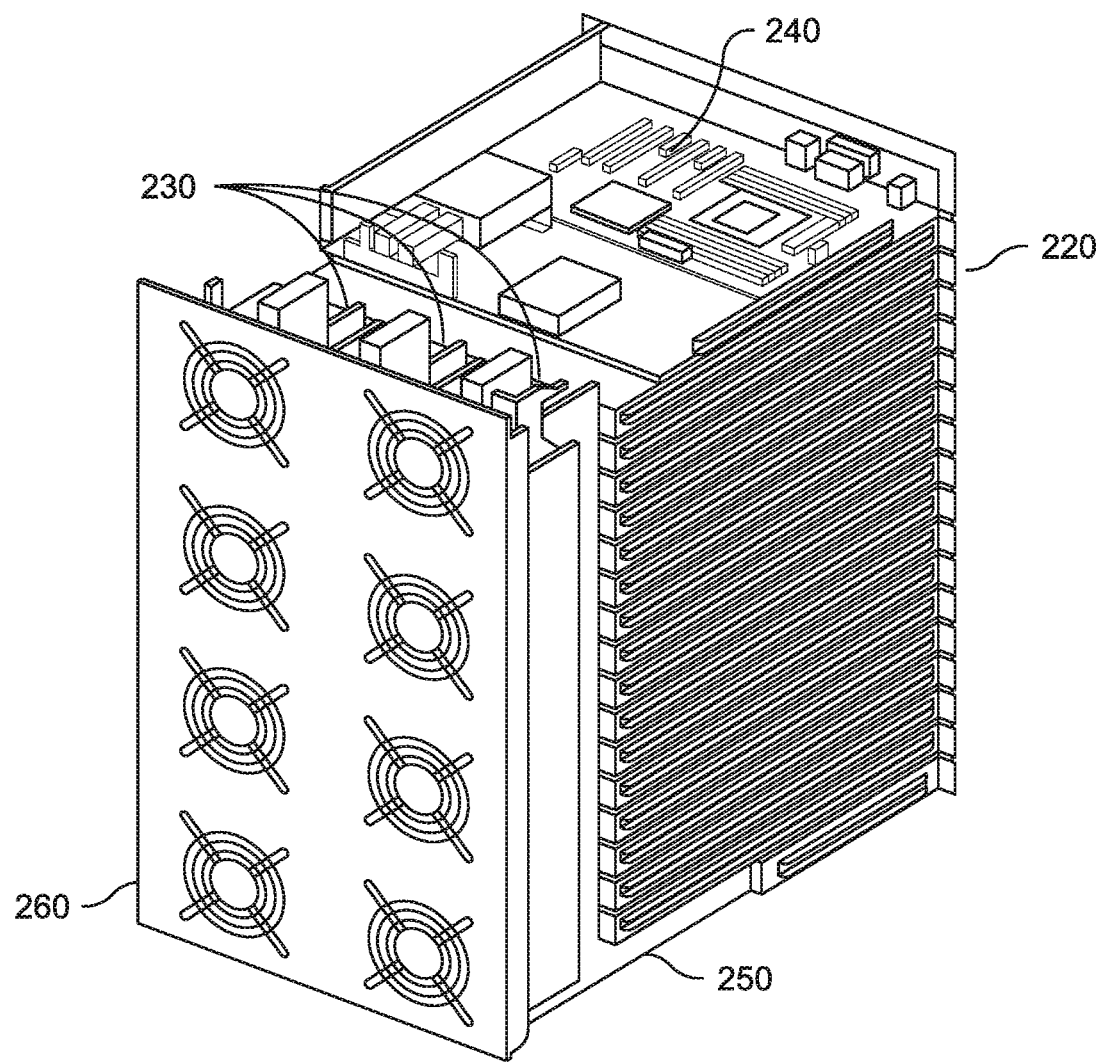

Referring now to FIG. 2, in connection with FIG. 1C, there is provided an exemplary embodiment of a non-Clos data network switching apparatus 200 for communicating data packets from a first switch-connected peripheral device (e.g. device A of FIG. 1C), to a second switch-connected peripheral device (e.g. device K of FIG. 1C) within an Ethernet architecture. In the non-limiting embodiment disclosed herein, apparatus 200 illustrates a modular architecture wherein a plurality of circuit boards or line cards $220_a$, $220_b$, ... $220_n$ are housed within chassis 210. The line cards may be implemented as modular circuit boards, each having a faceplate with I/O ports or slots for connection with peripheral devices for transceiving data packets. It is understood that various types of serial links may be utilized for connection therewith, such as Peripheral Components Interconnect/PCIe, by way of non-limiting example. The I/O communications between peripheral devices may be implemented as one or more of 10 Gb, 25 Gb, 40 Gb, 50 Gb, 100 Gb and/or other relative data rate signal line processing. As shown in FIG. 2, the integrated fabric module 215 according to the present disclosure includes each of the semiconductor crossbar switch elements $225a$, $225b$, ... $225n$, having its external I/O ports for connecting to peripheral devices through a corresponding line card, and its internal I/O ports connected to corresponding internal I/O ports on every other semiconductor crossbar switch element via the point-to-point electrical mesh interconnect 230.

For each semiconductor crossbar switch element associated with a given line card, a control plane includes a control micro-processor and CPU memory in communication with a master controller 240 and address routing table (e.g. via a separate Ethernet connection) for receiving routing table entries and updates for transfer into each of the semiconductor switch elements. Once received in each of the switch elements (e.g. FPGAs), each routing table gets populated into the forwarding engine for each of the switch flow modules in each of the FPGAs.

FIGS. 2A-2D illustrate an exemplary embodiment of the schematic structures illustrated in FIG. 1C and FIG. 2. With respect to FIGS. 2 and 2A-2D, like reference numerals are used to indicate like parts. As shown, a plurality of rack mounted modular line cards $220a$, $220b$, ... , $220n$ may be removably inserted into a corresponding slot or cavity within the chassis. Although shown in a horizontally stacked configuration with 16 line cards (i.e. $220_1$, ... , $220_{16}$), it is understood that other configurations may be implemented.

Various cutaway views of the network switch implementation 200 having a chassis 210 housing a plurality of removable line cards with integrated fabric module are depicted in FIGS. 2A, 2B, 2C, and 2D. In this exemplary embodiment, each line card has disposed thereon a semiconductor crossbar switch element in the form of an FPGA. Each FPGA is connected to every other FPGA on a separate line card, via a vertical backplane point-to-point electrical mesh interconnect 230. In an embodiment, the on board FPGA chips have internal I/O ports connected in point-to-point fashion via a silicon-free printed circuit board trace interconnect backplane. A motherboard 240 containing a master computer processing unit (CPU) and lookup/routing tables provides control and communications via a control plane with each of the FPGAs (FIG. 3) disposed on line cards 220. Power is provided via a power control board 250 containing a power supply and accompanying electronic circuits and is configured at the basis of the chassis. The power supply module may include, for example, a 12 V power supply, AC/DC module, and distribution module for supplying power to the system. A fan assembly 260 is mounted at a back end of the chassis and includes a series of fans positioned relative to the line cards and backplane structures so as to provide optimal cooling to the unit. The illustrated embodiment includes a series of I/O ports on its faceplate for receiving, and outputting signals through the line card with integrated fabric structure in a manner that reduces the number of hops, increases speed and reduces power consumption.

In the illustrated embodiment of FIGS. 2A-2D, the point-to-point electrical mesh interconnect may be implemented as a plurality of vertically oriented printed circuit boards with trace connections electrically connected to each of the FPGA's internal I/Os on each line card via appropriate connector modules 232, 234 according to the desired I/O port speed for the particular switch elements. By way of non-limiting example, connectors such as those manufactured by Molex may used to provide 64 transmission line differential pairs within a given connector module (e.g. 10 Gb transmission).

Figure 2D:
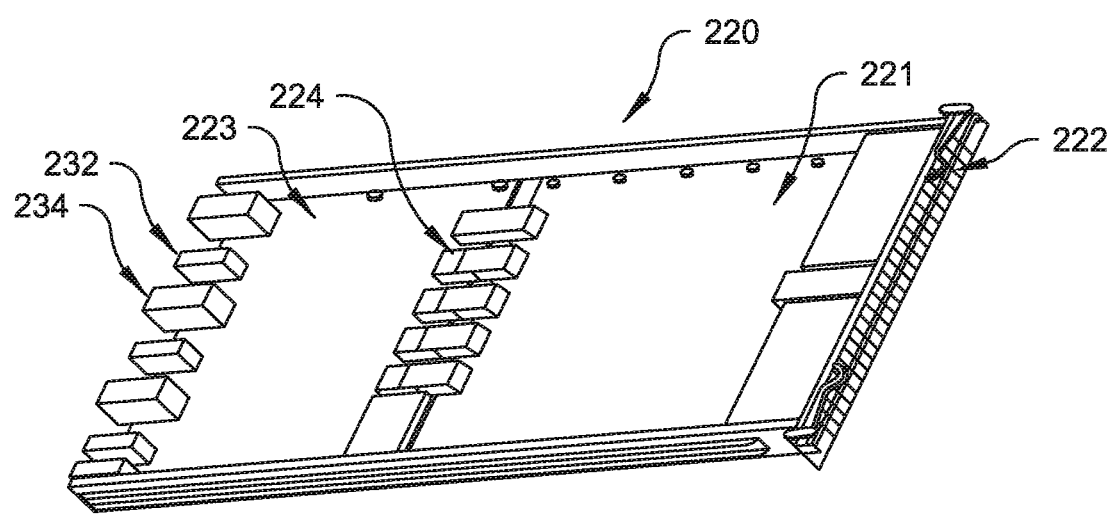

FIG. 2D shows a more detailed view of an exemplary line card useful for implementing an embodiment of the present disclosure. As shown, line card 220 may be implemented in a standard 1U (1.75 inch height) configuration. In the particular implementation illustrated, faceplate slots 222 are configured to receive peripheral device connections via a standard pluggable interface for communicating data packets over the network interface. Connectors 224 operate to convey the I/O data packets directly from each of the faceplate terminals (lines not shown in FIG. 2D) to corresponding external I/O ports (not shown in FIG. 2D) of the semiconductor crossbar switch element disposed on circuit board 223 of line card 220. In the illustrated embodiment, circuit board 221 provides direct I/O connections from the faceplate to board 223 via connectors 224, but is effectively available for utilization for other processing and/or networking functionality.

As described herein, a control processor is configured to maintain a lookup table mapping peripheral device connections with corresponding I/O ports associated with the plurality of line cards. A crossbar switching element (e.g. L1, L2, . . . ) is configured on each line card, where the crossbar switching element is adapted to enable electrical connection of any one of the line card I/O ports through direct point-to-point electrical mesh interconnect pattern (1003) which connects each of the plurality of line cards with every other one of the line cards, to a corresponding destination port on one of the plurality of line access cards, in response to detection of a data packet on an ingress I/O port of a given line card, and according to the lookup table mapping based on an address header of the data packet. In this manner, transmission of data packets between input and output ports of any two line cards and respective cross bar switch elements from source to destination occurs in only two hops.

The control plane includes a control micro-processor and CPU memory in communication with the motherboard on each line card for transfer of routing table entries into each of the FPGAs. Once received in each of the FPGAs, the routing table gets populated into the forwarding engine for each of the switch flow modules (FIG. 5) in each of the FPGAs. Each SFM has the forwarding engine which uses that table. In an embodiment, each SFM may have its own table. The logic that accesses that table is represented as the forwarding engine.

Figure 3:
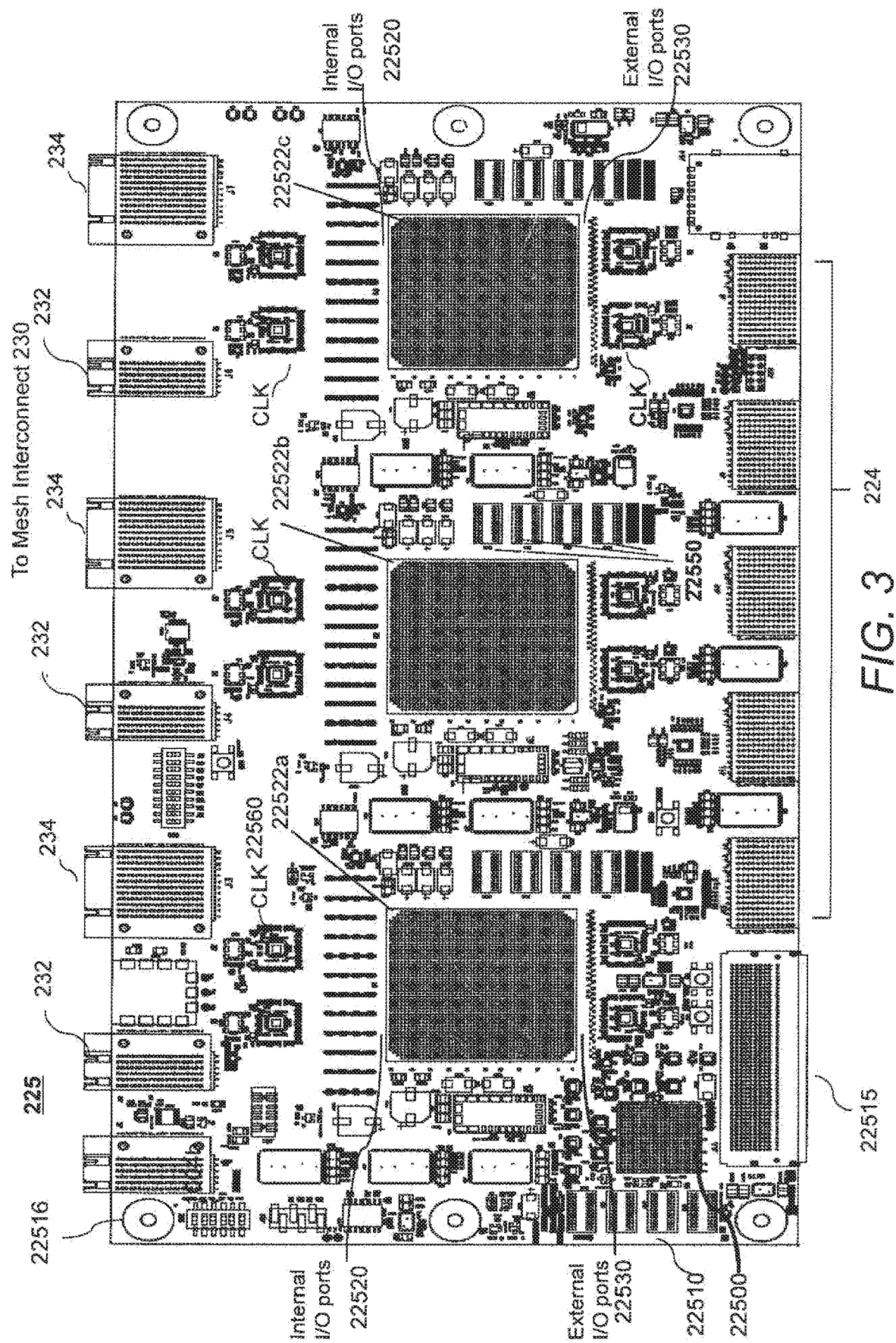
FIG. 3 is an exemplary illustration of components of a semiconductor crossbar switch element embodied as an FPGA architecture disposed on a line card with I/O interconnects to a printed circuit backplane of point-to-point direct electrical interconnections between different semiconductor switch elements for implementing the data packet network switching functionality according to an embodiment of the disclosure.
Figure 4:
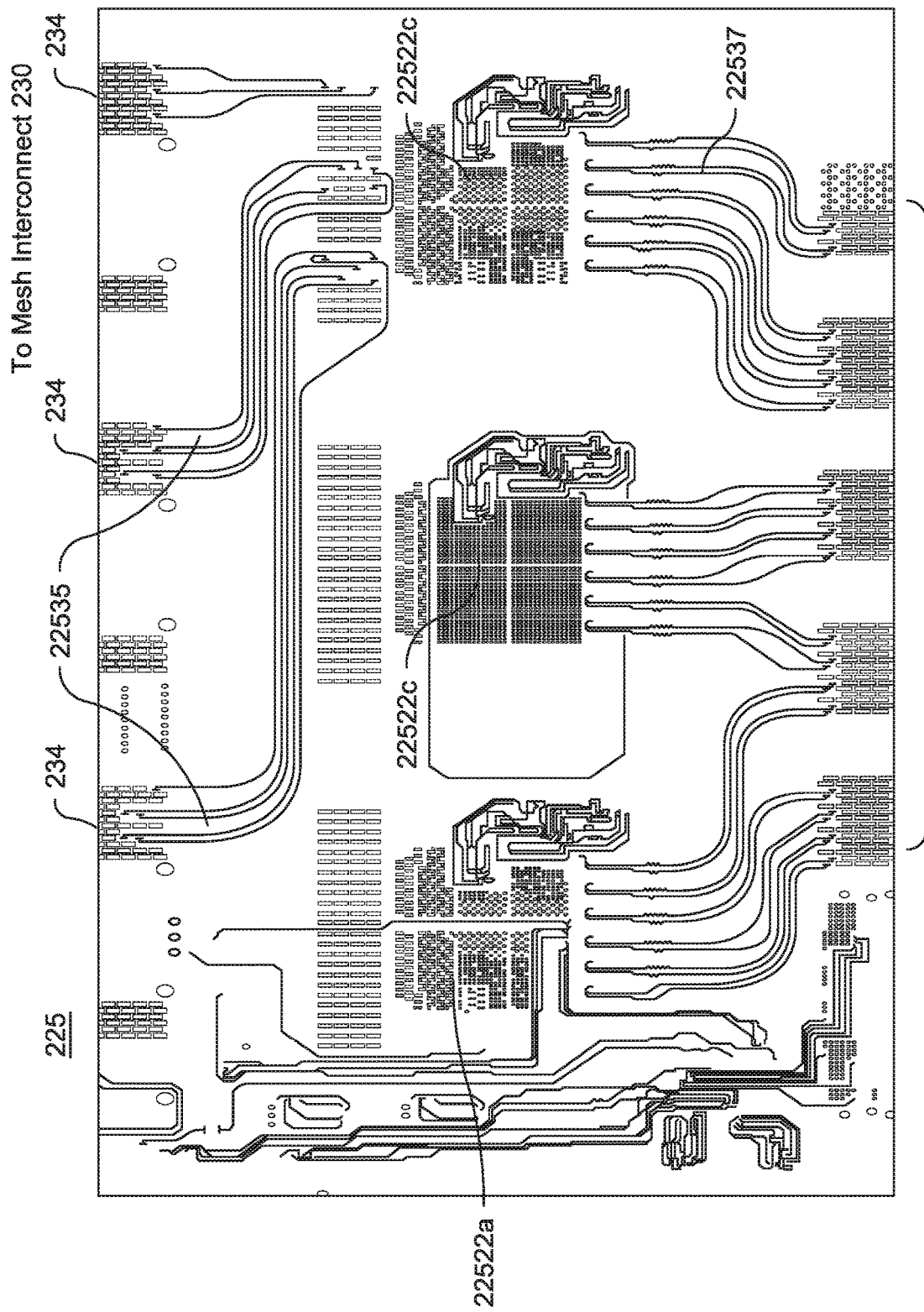
FIG. 4 is a more detailed illustration of FIG. 3, depicting transmit (egress) signal lines out of a semiconductor switch element to interconnections on the printed circuit backplane for data packet transmission to a destination device for implementing the network switch functionality according to an embodiment of the disclosure.
Figure 4A:
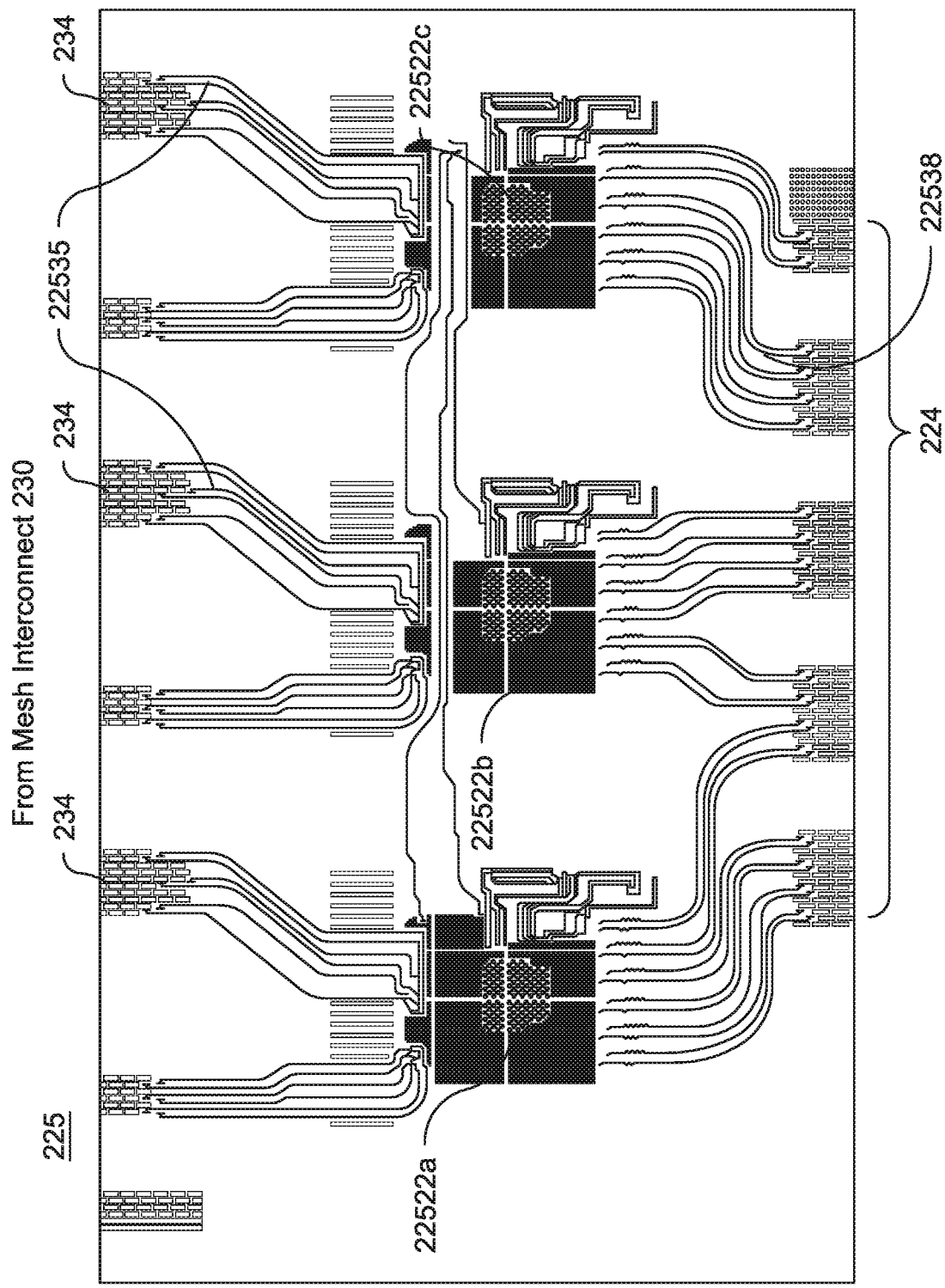
FIG. 4A is a more detailed illustration of FIG. 3, depicting receive (ingress) signal lines out from the printed circuit backplane to a receiving (ingress) semiconductor switch element for data packet reception at a destination device for implementing the network switch functionality according to an embodiment of the disclosure.

FIG. 3 is illustrative of the components of each of the semiconductor cross-bar switch elements labeled generally as 225 (FIG. 2) and disposed on a circuit board such as a line card 200 (FIG. 2) according to an exemplary embodiment of the disclosure. FIGS. 4 and 4A illustrate more detailed representations of element 225 disposed on a line card 200, including an illustration of exemplary signal paths among components and particular Tx/Rx communications within the fabric. Referring to FIGS. 3, 4, and 4A, each semiconductor crossbar switch element includes a field programmable gate array (FPGA) 225222 disposed on a circuit board implemented as a line card. In the exemplary embodiment of FIG. 3, three FPGAs 22522a, 22522b, and 22522c are disposed on each line card and implemented as routing and forwarding engine in order to route the data packet signals (e.g. 48 lines of one or more of 10 Gb, 25 Gb, 40 Gb, 50 Gb, 100 Gb). Each FPGA has its external I/O ports 22530 directly connected to corresponding terminals of connectors 224. Internal I/O ports 22520 are connected with every other FPGA on every other line card via a direct (i.e. point-to-point) electrical mesh interconnect through connectors 232, 234. In an embodiment, the three FPGAs shown in FIG. 3 are coupled to the other FPGAs on every other line card via a semiconductor-free or silicon-free printed circuit board backplane comprising 6 vertical printed circuit boards 230 (FIGS. 2A-C) and corresponding connectors 232, 234. Preferably, input/output channels are arranged evenly across the three integrated circuit chips or FPGAs disposed on each of the line cards. Each chip outputs on 48 I/O lines differential paired, to transceiver (T/R) modules, which transmit via the passive fabric to respective inputs. The passive fabric thus provides a direct connection between T/R modules. By enveloping the functionality of the forwarding engine, crossbar switch, control plane, and point-to-point electrical mesh interconnect within an integrated fabric of the semiconductor crossbar switch element, the number of chip traversals needed to forward a packet from one peripheral device to another is reduced. Hence, the power costs corresponding to the number of serial/parallel/serial conversions or SERDES traversals, are advantageously reduced through the present architecture and processing. More particularly, as the routing and forwarding engine along with the switching functionality is all performed within the semiconductor switching element (e.g. silicon FPGA) and data packets communicated between egress and ingress FPGAs through the point-to-point electrical mesh interconnect, significant power reduction is realized. This is significant as each of the transceivers or SERDES on an integrated circuit or FPGA chip dissipate about 50% of the power required. Thus, by reducing the number of hops and hence number of transceivers, along with collapsing the switching within the geometry of the FPGA, significant power savings are achieved.

Each FPGA has associated packet buffering functionality for regulating network traffic and mitigating network congestion and which may be implemented as one or more DDR memory units 22550. Clock (CLK) sources 22560 associated with each of the FPGAs are configured to control timing and routing of data packets, processes, and control mechanisms throughout the chip.

In the embodiment illustrated in FIGS. 2A-2D, the vertical backplane electrical mesh interconnect structure is configured as having a maximum of 72 differential pairs of signals (Tx/Rx). Each semiconductor switch element associated with each line card has 3 FPGAs per line card. Thus, 48 FPGA chips may be accessed within the chassis such that, for 72 differential pairs, the pathways traversing the various connectors, for each handling 50 Gbe, corresponds to 4 TB per connector. Further, according to embodiments of the present disclosure, the communications paths between peripheral devices are non-optical within the apparatus. Only at the control plane where QFSP/FSP optical processing occurs, which processing is not part of the data packet forwarding path. In an embodiment, each of the printed circuit boards is via-free, with each board having multiple layers or laminates for processing the various Tx/Rx signal paths.

In an embodiment of the present disclosure, data packets enter the line card with address data content and each packet is addressed by tables controlled and updated by the motherboard to one of the 48 outputs on the chip. Transmission is fanned out on all three modules while reception (over the mesh interconnect) is provided on a subset of FPGA modules for a given line card.

In an embodiment of the disclosure, the switch element 225 is configured to perform all of the routing and disposition on the chip such that the forwarding engine and routing engine is co-located within the switch element on the corresponding line card 220. In this manner, ultimate point-to-point connection and routing over the electrical mesh interconnect provides an essentially wired communication path which reduces the SERDES requirements for each differential pair entering/exiting the transceiver face of the line card. In the exemplary embodiment, the circuit board or line card is composed of multiple different routing layers of separate transmit and receive layers. Similarly, in one embodiment, the electrical mesh interconnect embodied in one or more printed circuit boards contains corresponding multiple laminate layers for signal transmit and receive functionality.

FIG. 4 illustrates operation of the switch element in connection with the point-to-point electrical mesh interconnect showing select signal line connections 22535 (internal I/O ports) for activation and forwarding of data packets on the egress side of FPGA 22522c. Also illustrated are switch element I/O signal line connections 22537 (external I/O ports) to select terminals 224 for connection with the peripheral devices for each of FPGAs 22522a-c.

FIG. 4A illustrates operation of the switch element in connection with the point-to-point electrical mesh interconnect showing select signal line connections 22536 (internal I/O ports) for receiving data packets at the ingress side of each FPGA 22522a-c. Also illustrated are switch element I/O signal line connections 22538 (external I/O ports) to select terminals 224 for connection with the peripheral devices for each of FPGAs 22522a-c.

Figure 7A:
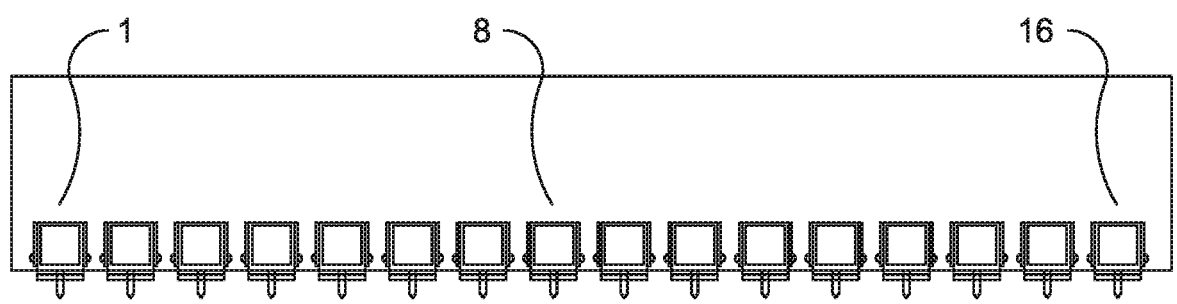
FIG. 7A is an exemplary illustration of the point-to-point electrical mesh interconnect structure for providing direct connection between integrated circuits on a plurality of line cards for data packet transfer according to an embodiment of the present disclosure.

FIG. 7A is an exemplary illustration of the point-to-point electrical mesh interconnect structure for providing direct connection between integrated circuits on a plurality of line cards for data packet transfer according to an embodiment of the present disclosure. Each terminal connection provides a separate routing path for a differential pair connection associated with 16 line cards/switch elements.

Figure 7B:
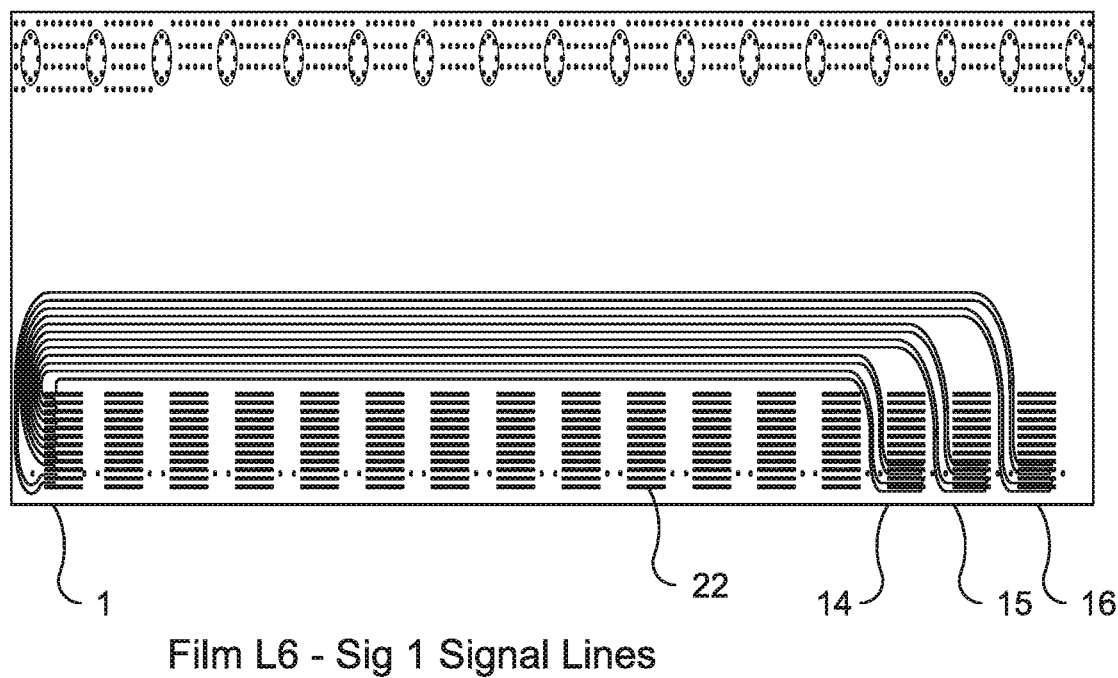
FIG. 7B is an exemplary illustration of the point-to-point electrical mesh interconnect structure showing select signal communication lines for providing direct connection between semiconductor switch elements disposed on line cards for data packet transfer according to an embodiment of the present disclosure.

FIG. 7B is an exemplary illustration of the point-to-point electrical mesh interconnect structure showing select signal communication lines 22 for providing direct connection between semiconductor switch elements disposed on line cards for data packet transfer according to an embodiment of the present disclosure. As can be seen, select connector paths for the differential pairs are fixedly established between internal I/O terminals according to FPGA I/O arrangement and line card identification. As shown, the connection within a given layer of the mesh interconnect shows signal path connectivity between line cards 1, and 14, 15, and 16, by way of non-limiting example.

Referring again to FIGS. 2-4, in an embodiment of the disclosure a control plane on each switch element associated with each line card comprises an internal Ethernet network in communication with the motherboard for communicating independently with each line card/switch element. Communication is accomplished by the control plane sending to each of the line cards their routing table(s) to establish each line card's configuration as to where to send data packets on the network. In an embodiment, a plurality of QSFP ports (e.g. 2 bidirectional QSFP ports from mother board to each line card—2 per line card) provides for n=16 QSFP control signals and 16 line cards within the system in order to provide point-to-point control via the Ethernet within the system. It is understood that other numbers of line cards and/or control signal may be implemented, such as n=4, n=16, or n=32 line cards, by way of non-limiting example. Furthermore, modulation schemes such as PAM-4, QAM, QPSK may be implemented within the system as is understood by one of ordinary skill in the art. A processor such as an Intel Pentium or Xilinx processor or other such microprocessor device is configured on the control plane for controlling the routing through the network. The control plane operates to constantly read source device addresses (e.g. source MAC address) for devices to add to and/or update the table of connections within the system. As will be understood, for each FPGA, each port is numbered and associated with line card, FPGA, and point-to-point fabric electrical interconnect and is known a priori. Because MAC addresses are required to decay at periodic intervals (e.g. 5 sec.), in order that a new device may connect to the network (or an existing device may be maintained), the control plane is constantly responsive to such device broadcasts and reads, updates, and downloads from its master table within the management plane, the mapping table in order to provide refreshed look up tables for each of the semiconductor switch elements associated with each line card. Accordingly, the system learns via the source MAC address of each peripheral device its relative location on the network and based on a received destination MAC address, operates to obtain the destination location (e.g. line card number, FPGA number, output port) connected thereto and provide the requisite output port for transferring the data packet. Depending on the type bits received, the system is operable to index down into the payload in order to retrieve the address (e.g. VXLAN processing). Once the process is complete and the LUT provides the destination output port, the semiconductor crossbar switch element forwards the data packet along with the requisite destination output port number via the electrical mesh interconnect, thereby consolidating the forwarding engine into the switching engine.

As discussed hereinabove, an embodiment of the present disclosure provides for an internal network such as an Ethernet network linking the motherboard or master control to all of the line cards in the chassis. A second internal Ethernet network is disposed on each line card and links all of the FPGAs on each line card to the control microprocessor (e.g. 22500). Thus, the master lookup table is populated (at the motherboard) and updated with requisite peripheral device connections and flow control is provided to each of the lookup tables on each of the N line cards via N separate parallel Ethernet channels to enable simultaneous writes/updates of the respective tables on each line card. The microprocessor on each line card then sends out the updated tables to each FPGA to enable routing. In an embodiment, the microprocessor on each chip may be an ARM processor operable to execute at a 10G line rate to enable efficient table access and updates (e.g. 3.33 GHz). In an embodiment, the master controller CPU on the motherboard through the network operating system writes the look up tables onto each of the line card/semiconductor switch elements and calls a device driver to modify a programmable chip.

Figure 5:
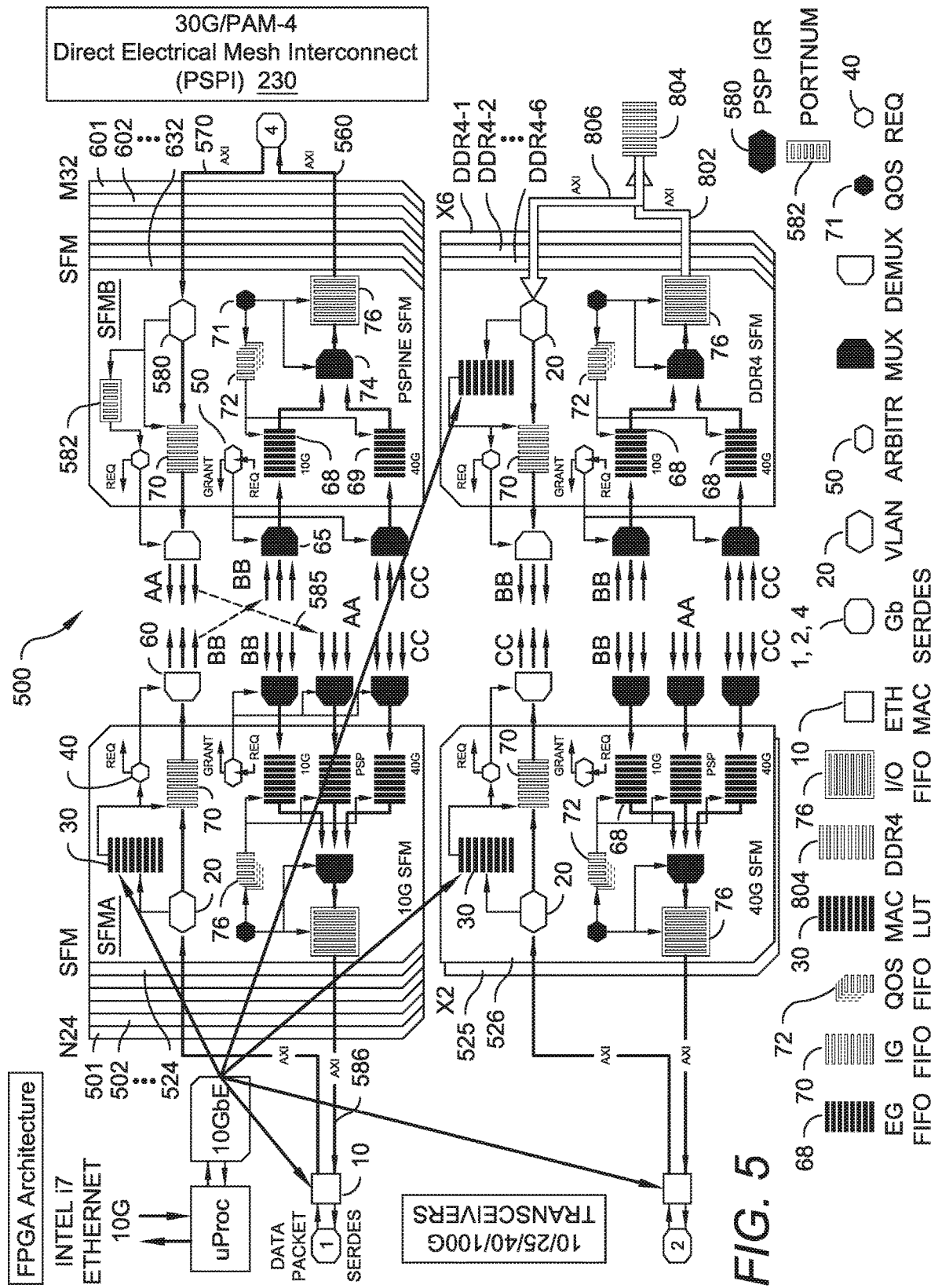
FIG. 5 is a schematic diagram illustrating components of switch flow module processing associated with a semiconductor switch element embodied as an FPGA architecture for controlling the network data packet transfer from source to destination peripheral devices according to an embodiment of the disclosure.

The block diagram of FIG. 5 shows an exemplary internal FPGA architecture of a hyper scale switch slice (HSS) according to an embodiment of the present disclosure. The HSS diagram effectively equates to a single FPGA, with 2 or, in the present embodiment, 3 FPGAs in a line card. As discussed above, in an exemplary embodiment, 16 line cards are provided in a hyper scale switch chassis and dependent upon the line card capability as a 10/25/40/100G Ethernet functionality. In an exemplary embodiment, a plurality of Switch Flow Modules (SFM) (e.g. 58) are provided for a 10 Gb switch element with integrated fabric. Other numbers of instantiations may be required for different rate switching (e.g. 40 Gb). The SFM contains the ingress/egress FIFO, Routing Lookup Table and sequencers. The SFM is triggered and commences packet transfers in reaction to the Ethernet MAC core control signals emanating from the core microprocessor (e.g. Xilinx Ethernet Core) on the I/O side indicating reception of a packet. An additional way that triggers will occur are for packets that come in via the transceiver to cause the sequencer/scheduler to initiate a request to transfer to the appropriate egress port via a cut through flow. The appropriate port is determined from the router lookup table and hash function to reduce the address space. The egress stage of the SFM grants requests through an arbiter that resolves simultaneous requests from multiple SFMs. A User Interface AXI Bus manages the router and lookup tables. Quality of Service (QoS) prioritization is implemented in accordance with Ethernet rules.

Referring again to FIG. 3 in conjunction with FIG. 5, overflow processing (DDR) is provided so as to divert packets that cannot be forwarded due to contention to a buffer for subsequent processing. In addition, the integrated semiconductor switch and fabric according to an embodiment of the present disclosure comprises a plurality of n layers or laminates (e.g. n=16) to facilitate the volume of signal connections and direct point-to-point connections within the system.

Figure 6A:
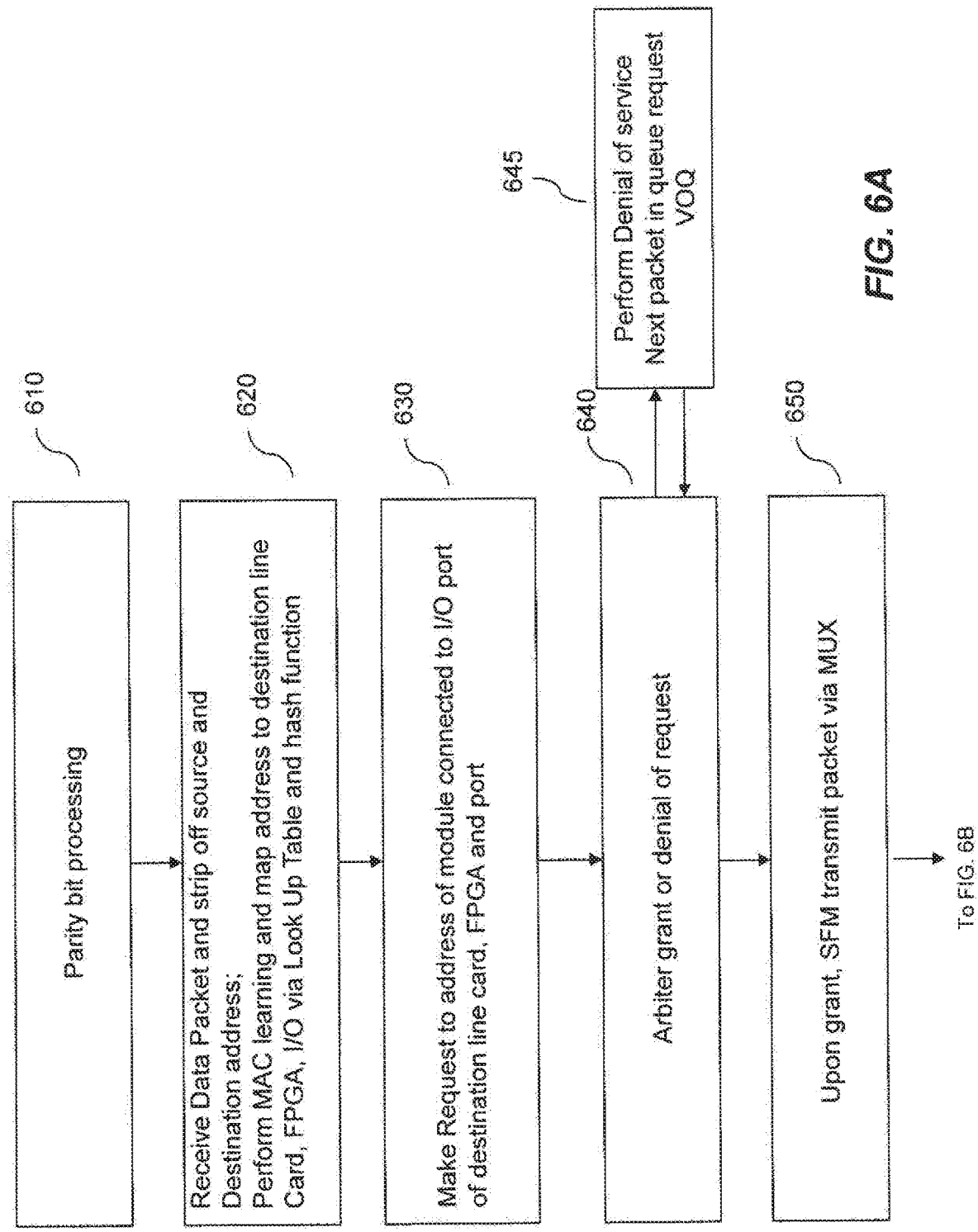
FIG. 6A-6B is a process flow illustrating a method of sending a data packet through a network switch with semiconductor switch elements and point-to-point electrical mesh interconnect according to an embodiment of the present disclosure.
Figure 6B:
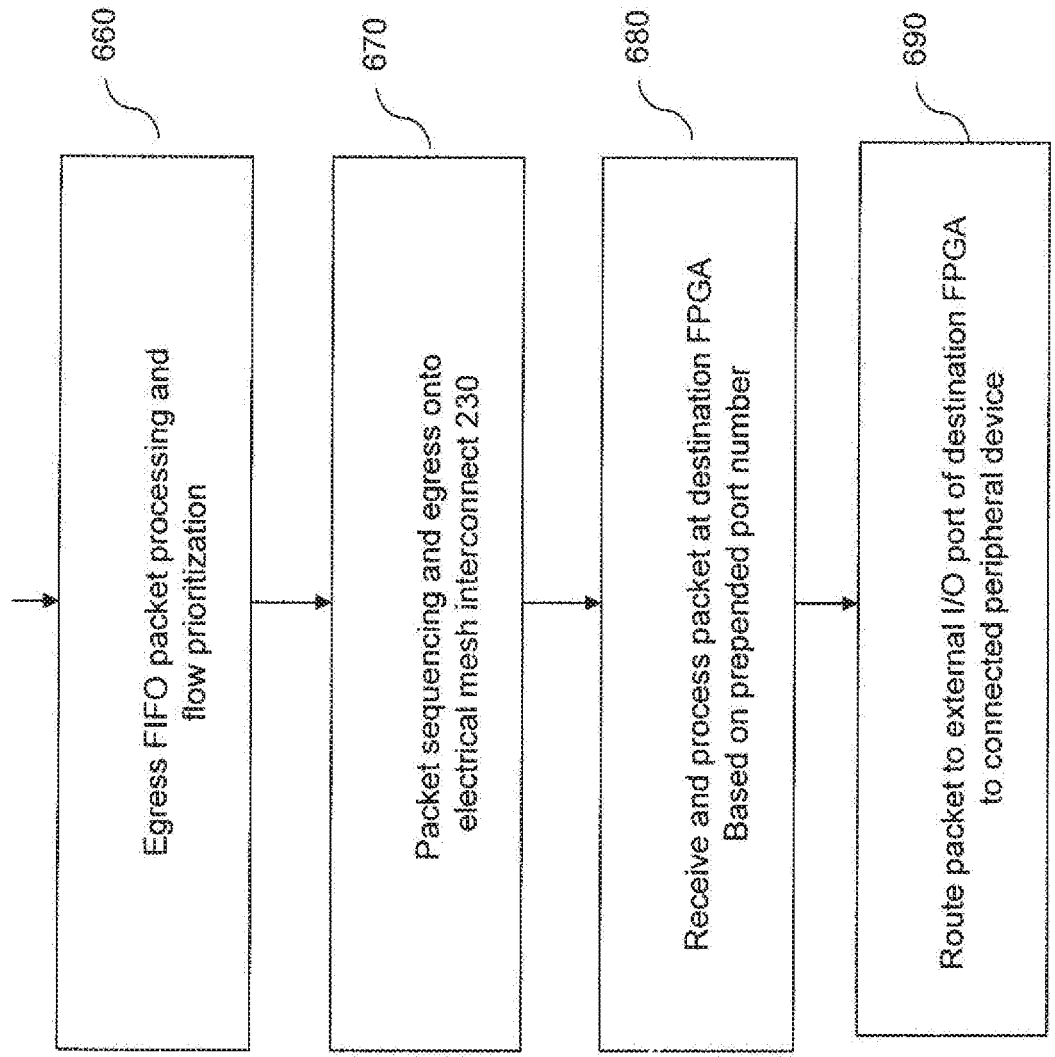

Referring now to FIG. 6 in conjunction with FIG. 5, there is disclosed a process flow illustrating steps for sending a data packet through a semiconductor crossbar switch element and electrical mesh interconnect according to an embodiment of the present disclosure.

In an exemplary embodiment, the FPGA architecture of FIG. 5 is embodied as a set of N (e.g. N=26) switch flow software modules or components (SFMs) designated as I/O SFMs (labeled 501, 502, . . . , 526), and M (e.g. M=32) SFMs designated as direct connect SFMs (labeled 601, 602, . . . , 632). The direct connect SFMs each have direct connections to the electrical mesh network 230 for packet transport. In an embodiment, each of the I/O SFMs of each FPGA can accept requests from both direct connect SFM modules as well as I/O SFM modules of the FPGA. Direct connect SFM modules are configured so as not to be able to send requests to other direct connect SFMS. In an embodiment, each FPGA's SFM digital logic circuit modules and functionality and behavior may be implemented in hardware description language (HDL) useful in describing the structure and behavior of those modules depicted in FIG. 5.

Within the FPGA architecture shown in FIG. 5, a data packet is received at SERDES 1 and communicated to MAC processing module 10 which provides up-chip or down-chip processing (depending on ingress/egress flow) (FIG. 6 block 610). Processing module 10 operates to decrease/increase the packet bit number by N bits (e.g. N=2 from/to 66 bits to/from 64 bits) to address parity as part of the input/output processing and timing or re-timing functionality associated with the switch flow modules of FIG. 5. In this manner, communication channel noise is mitigated by stripping off 2 bits upon entry into the SFM and adding 2 bits upon exit.

Processing proceeds to SFM sequencer module 20 (e.g. VLAN processing) within the SFM FPGA architecture. Sequencer module 20 (e.g. of SFM A) operates to strip off the MAC source address and destination address from the incoming packet (FIG. 6 block 620). The source address is utilized by the system for learning (e.g. MAC learning) to determine what devices are connected to the network at particular ports and update the master table and corresponding downstream tables for each of the line cards. On the condition that a device address is not in the lookup table, the system forwards to the microprocessor for delivery to the motherboard for formulation into each of the lookup tables. The destination address is used as an index into the lookup table (LUT) 30 on SFM A in order to determine the output port to route the packet to. This may be implemented via random access memory (RAM) or other on chip storage media. FIG. 6C is an example showing a LUT wherein an 11 bit field is stored, including 4 bits for line card identification (e.g. line card 1-16), 2 bits for FPGA identification on the line card (e.g. FPGA 1-3), and 5 bits of I/O in order to map to 32 different I/O ports. A 2 bit field identifying whether the packet at that particular FPGA is to be routed via the direct electrical mesh interconnect structure or whether the routing pathway is merely internal to the particular FPGA and/or line card associated with that FPGA (and therefore not sent via the electrical mesh fabric interconnect) may also be provided. Under such condition (i.e. 11(PSP)) the route path would not pass via the direct electrical mesh interconnect structure (e.g. source and destination on one of the FPGA's on the same line card).

Referring again to FIG. 5 in conjunction with FIG. 6, the sequencer module utilizes the MAC address as an index to find the mapping location and raise a request (module 40) to a corresponding SFM (e.g. SFM B) that is connected to the determined line card and the determined FPGA on the line card, in order to route the data packet to the appropriate destination (FIG. 6 block 630). Arbiter module 50 (SFM B) receives the request from I/O SFM A (as well as any other SFM requesting packet transfer) and selects the particular request for processing (FIG. 6 block 640). Upon grant of the request, the packet is transported via the cross-bar multiplexer (MUX) arrangement 60-65 for downstream processing (FIG. 6 block 650).

Upon grant of the request, the queued data packet in buffer 70 (ingress FIFO) is transferred via MUX units 60, 65 to the egress FIFO (e.g. module 68) on direct connect SFM B. In an embodiment, the SFMs 601-632 are configured to accept both 10G and 40G pathways via their respective egress FIFO queues (68, 69) which are prioritized according to the quality of service (QOS) processing module 71 and QOS FIFO queue module 72 (FIG. 6 block 660). The QOS module interacts with the VLAN processing to select and sequence via MUX 74 packets among the different process flows (e.g. 10G, 40G) according to priority requirements to transmit the packets in the FIFOs (along with the prepended I/O port number) out onto the electrical mesh interconnect 230 (FIG. 6 block 670). It is to be understood that MUX 74 performs priority swap or selection according to the priority of service whereby packets and their priorities are linked according to the queues (i.e. next in line processing) 72 and staging FIFO (e.g. I/O FIFO) 76.

In one embodiment, the FIFO operates to enable different data rates (10G/40G) to proceed through the FPGA by means of skewing/de-skewing the data rates by via input to the FIFO at a first rate and output from the FIFO at a different rate, as is understood by one of ordinary skill.

Still referring to FIG. 5, in conjunction with FIG. 6, once the data packet exits the initial FPGA at SERDES 4 (flow 560), it traverses the electrical mesh interconnect 230 which routes the packet to the destination FPGA. As shown in FIG. 5, at the destination FPGA, the sequencer 580 (via flow 570) receives the packet and correlates the port number prepended on the packet in port number queue 582 with the packet number staging and routing of the packet to the destination port address (FIG. 6 block 680). As previously described, request processing and communication onto the particular port associated with the FPGA via the particular SFM is made through the crossbar (e.g. flow 585) which proceeds through the respective SFM (501-526) to the output port (e.g. flow 586) for receipt by the port connected peripheral destination device (FIG. 6 block 690). As shown, flow arrows identified as AA, BB, and CC represent data packet flows through the crossbar (e.g. at 22 GB rate), with flow arrows identified as AA being at a rate of about 22 GB, and arrows BB and CC representing data packet rates of 10 GB and 40 GB, respectively.

The FPGA architecture further includes overflow processing SFMs (e.g. 6 instantiations) to alleviate throughput bottlenecks. As shown, in the event of a significant blockage of data flow, a request is made to deposit the overflow packets to an external repository 804 via flow 802. Overflow packets may be retrieved from DDR (e.g. DDR4) FIFO 804 via flow 806.

In one embodiment, in the event that the packet request is denied, processing proceeds to the next packet in the queue for a request. Processing of that next packet then proceeds as outlined hereinabove. In the event that the request is granted and processing of that next packet proceeds to its destination port, then a new request is made for the previously denied packet. Otherwise, in the event of a second denial, processing proceeds to the next packet in the queue for a request. As the denial of service request provides for multiple (e.g. three deep) sequential packet requests, if the third packet in line gets denied, processing reverts back to the first packet for making a new request.

Thus, there is disclosed a non-Clos data network switching apparatus for communicating data packets from a first switch-connected peripheral device, to a second switch-connected peripheral device, the apparatus comprising a chassis; a plurality of line cards housed within the chassis and having I/O ports for transceiving data packets; a control processor configured to maintain a lookup table mapping peripheral device connections with corresponding I/O ports associated with the plurality of line cards, a crossbar switching element on each line card, the crossbar switching element configured to enable electrical connection of any one of the line card I/O ports through direct point-to-point electrical mesh interconnect pattern which connects each of the plurality of line cards with every other one of the line cards, to a corresponding destination port on one of the plurality of line access cards, in response to detection of a data packet on an ingress I/O port of a given line card, and according to the lookup table mapping based on an address header of the data packet, whereby transmission of packets between input and output ports of any two line cards and respective cross bar switch elements occurs in only two hops.

The embodiments are provided by way of example only, and other embodiments for implementing the systems and methods described herein may be contemplated by one of skill in the pertinent art without departing from the intended scope of this disclosure. For example, although embodiments disclose a data packet network architecture, apparatus, device, and/or method that implements the semiconductor crossbar switch element onto or associated with a given line card, such configuration is not essential to the practice of the disclosure, as such switch elements may be implemented in or onto other substrates, such as a backplane (or midplane), by way of non-limiting example. Further, although embodiments of the present disclosure illustrate a printed circuit electrical mesh interconnect, and connected in an interleaved backplane structure (relative to the line card/switch element configuration) such configuration is an advantageous embodiment but is not essential to the practice of the disclosure, as such electrical mesh interconnect may be implemented via other means, such as direct wire connection with no backplane or printed circuit board), and/or via other non-backplane structure (e.g. on a line card). In an embodiment, discrete wires such as micro coaxial or twinaxial cables, twisted pairs, or other direct electrical wire connections may be made with the internal I/O ports of each of the FPGAs through connectors and micro wire cables such as those provided for high speed interconnects. Modification may be made for pigtails for cable ready applications.

Still further, implementation of the present disclosure may be made to virtual switches within a data center or other segmented software-controlled data packet switching circuit. In such virtual data packet switched systems, the form of a plurality of semiconductor crossbar switch elements interconnected via a direct point-to-point electrical mesh interconnect with integrated switching, forwarding and routing functionality embedded into each crossbar switch, may be substituted for the prior art (e.g. Clos network) implementations, in order to reduce hops, decrease power dissipation and usage, and enable execution on a high performance computer server to provide for virtual segmentation, securitization, and reconfiguration. The semiconductor crossbar switch elements may be configured as virtual switches within a virtual machine (VM) for providing routing using MAC address header and lookup table mapping of configuration elements. As overlay network clients or VMs, require gateways to provide routing functionality, the present disclosure enables OSI layer 2 or layer 3 switching for redirecting data message traffic, using the destination Media Access Control (MAC) address and logical sublayers to establish initial connection, parse the output data into data frames, and address receipt acknowledgments and/or queue processing when data arrives successfully or alternatively, processing is denied.

By way of further example, processing systems described herein may include memory containing data, which may include instructions, the instructions when executed by a processor or multiple processors, cause the steps of a method for performing the operations set forth herein.

While the foregoing invention has been described with reference to the above-described embodiments, various additional modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A non-Clos network data packet switch for communicating data packets from a first switch-connected peripheral device, to a second switch-connected peripheral device, comprising:
   (a) a plurality of semiconductor switch elements, each having a plurality of external I/O ports for connecting with corresponding peripheral devices for transceiving data packets, and a plurality of internal I/O ports;
   (b) a point-to-point electrical mesh interconnect defining a direct electrical connection between one internal I/O port of each semiconductor switch element, and one internal I/O port of each other semiconductor switch element;
   (c) a lookup table mapping peripheral device connections with corresponding external I/O ports associated with said plurality of semiconductor switch elements, wherein said lookup table includes mapping of each of the plurality of semiconductor switch elements I/O ports according to the point to point connectivity of the electrical mesh interconnect to the internal I/O ports of each semiconductor switch element;
   (d) wherein each semiconductor switch element is configured to:
      in response to receipt of a data packet on one of its external I/O ports, said data packet comprising header information including data indicative of a source address of the source peripheral device and of a destination address of the destination peripheral device, a) determine the destination semiconductor switch element for the data packet and the destination external I/O port of the determined destination semiconductor switch element, according to the lookup table mapping and the data indicative of the destination address; and b) activate a corresponding one of the internal I/O ports that connects, via the point-to-point electrical mesh interconnect, to the determined destination switch element connected to the destination peripheral device, and output the data packet and an indicator of the destination external I/O port via said internal I/O port; and in response to receipt of a data packet and indicator of a destination external I/O port on one of its internal I/O ports, output the data packet onto the external I/O port identified by the indicator, to thereby output to the second switch-connected peripheral device directly connected thereto.

2. The switch according to claim 1, wherein the destination semiconductor switch element and the destination external I/O port is determined according to the lookup table mapping using said data indicative of the destination address as an index to the lookup table.

3. The switch according to claim 1, wherein each of the plurality of semiconductor switch elements includes a control plane having a processor and memory in communication with a master controller and address routing table for receiving routing table entries and updates for transfer into each of the semiconductor switch elements.

4. The switch according to claim 1, wherein the destination switch element connected to the destination peripheral device, in response to receipt of a data packet and an indicator of a destination external I/O port on one of its internal I/O ports, discards header data prior to output of the data packet onto the external I/O port identified by the indicator.

5. The switch of claim 1, wherein the semiconductor switch element includes at least one field programmable gate array (FPGA).

6. The switch of claim 1, wherein the point-to-point electrical mesh interconnect is comprised of at least one multi-layer stack of electrically interconnected printed circuit boards.

7. The switch of claim 6, wherein the at least one multi-layer stack of electrically interconnected printed circuit boards is silicon-free.

8. The switch of claim 1, wherein the point-to-point electrical mesh interconnect is comprised of a plurality of discrete wires.

9. The switch of claim 1, wherein the header information includes one of a MAC address and an IP address, and wherein the lookup table stores one of MAC addresses and IP addresses corresponding to connected peripheral devices.

10. The switch of claim 1, wherein each semiconductor switch element is configurable for one of 10 Gb, 25 Gb, 40 Gb, 50 Gb, and 100 Gb signal line processing.

11. In a non-Clos data packet switching network having a plurality of semiconductor switch elements, each of the semiconductor switch elements having an integrated circuit with internal and external input/output (I/O) ports, a method for communicating data packets between peripheral devices attached to the network at select ones of the external I/O ports, the method comprising:

providing a direct point-to-point electrical mesh interconnect defining direct electrical connections between internal I/O ports of corresponding semiconductor switch elements;

continuously mapping peripheral device connections with corresponding external I/O ports associated with said plurality of semiconductor switch elements into a lookup table, wherein said lookup table includes mapping of each of the plurality of semiconductor switch elements I/O ports according to the point to point connectivity of the electrical mesh interconnect to the internal I/O ports of each semiconductor switch element;

determining, in response to a data packet received on one of its external I/O ports, the destination semiconductor switch element for the data packet and the destination external I/O port of the determined destination semiconductor switch element, according to the lookup table mapping using header information in the received data packet as an index into the lookup table;

activating a corresponding one of the internal I/O ports that connects to the determined destination switch element connected to the destination peripheral device via the point-to-point electrical mesh interconnect, and outputting the data packet and an indicator of the destination external I/O port via said internal I/O port; and outputting, in response to a data packet and an indicator of a destination external I/O port received on one of its internal I/O ports, the data packet onto the external I/O port identified by the indicator, to thereby output to the second switch-connected peripheral device directly connected thereto.

12. The method of claim 11, wherein said mapping of values in said lookup table is performed according to a hash function.

13. The method of claim 11, further comprising discarding header data prior to said output of the data packet onto the external I/O port identified by the indicator.

14. The method of claim 11, wherein outputting the data packet and an indicator of the destination external I/O port via said internal I/O port includes prepending the indicator of the destination external I/O port of the second network semiconductor switch element to the network traffic data packet.

15. The method of claim 11, further comprising diverting packets to a buffer for subsequent processing when said packets cannot be forwarded due to contention within one of said semiconductor switch elements.

16. The method of claim 11, further comprising, on the condition that a device address is not in the lookup table, forwarding said device address for updating into a master table.

* * * * *